(12) United States Patent
Yura et al.

(10) Patent No.: US 9,618,655 B2
(45) Date of Patent: Apr. 11, 2017

(54) METHOD AND APPARATUS FOR MANUFACTURING OPTICAL DISPLAY DEVICE

(71) Applicant: NITTO DENKO CORPORATION, Ibaraki-shi, Osaka (JP)

(72) Inventors: Tomokazu Yura, Ibaraki (JP); Satoru Koshio, Ibaraki (JP); Kazuo Kitada, Ibaraki (JP); Takuya Nakazono, Ibaraki (JP)

(73) Assignee: NITTO DENKO CORPORATION, Ibaraki-Shi, Osaka (JP)

( * ) Notice: Subject to any disclaimer, the term of this patent is extended or adjusted under 35 U.S.C. 154(b) by 52 days.

(21) Appl. No.: 14/434,721

(22) PCT Filed: Sep. 30, 2013

(86) PCT No.: PCT/JP2013/076469
§ 371 (c)(1),
(2) Date: Apr. 9, 2015

(87) PCT Pub. No.: WO2014/057826
PCT Pub. Date: Apr. 17, 2014

(65) Prior Publication Data
US 2015/0234096 A1    Aug. 20, 2015

(30) Foreign Application Priority Data

Oct. 10, 2012  (JP) .................................. 2012-224714
Sep. 25, 2013  (JP) .................................. 2013-198000

(51) Int. Cl.
*G02B 1/10*       (2015.01)
*B32B 37/18*     (2006.01)
(Continued)

(52) U.S. Cl.
CPC .............. *G02B 1/10* (2013.01); *B32B 37/025* (2013.01); *B32B 37/12* (2013.01); *B32B 37/18* (2013.01);
(Continued)

(58) Field of Classification Search
CPC ....... B32B 37/12; B32B 37/14; B32B 37/187; B32B 41/00; B32B 2457/20;
(Continued)

(56) References Cited

U.S. PATENT DOCUMENTS

2010/0288420 A1* 11/2010 Kimura ............... B32B 38/1841
156/64

FOREIGN PATENT DOCUMENTS

JP    2004-333647 A    11/2004
JP    2005-309371 A    11/2005
(Continued)

OTHER PUBLICATIONS

International Preliminary Report of Patentability issued Apr. 14, 2015 in connection with the counterpart International Patent Application No. PCT/JP2013/076469, citing the above reference(s).
(Continued)

*Primary Examiner* — George Koch
(74) *Attorney, Agent, or Firm* — Hauptman Ham, LLP

(57) ABSTRACT

A method for manufacturing an optical display device comprising: after completing lamination of a preceding optical film sheet to one of opposite surfaces of a preceding panel component at the predetermined laminating position, unwinding the carrier film in a state where another surface thereof folded to inside at a tip-end configuring a head portion of a peeling member and the carrier film is passed around the peeling member, and backwardly feeding a leading end of the optical film sheet supported on the carrier
(Continued)

film to a predetermined feeding position provided at upstream of the tip-end of the peeling member.

26 Claims, 14 Drawing Sheets

(51) Int. Cl.
    *B32B 37/12*     (2006.01)
    *B32B 37/00*     (2006.01)
    *B32B 38/10*     (2006.01)
    *B32B 38/18*     (2006.01)
    *B32B 41/00*     (2006.01)

(52) U.S. Cl.
    CPC ............. *B32B 38/10* (2013.01); *B32B 38/18* (2013.01); *B32B 41/00* (2013.01); *B32B 2307/40* (2013.01); *B32B 2551/00* (2013.01)

(58) Field of Classification Search
    CPC ........ B32B 2457/202; B32B 2457/204; B32B 2457/206; B32B 2457/208; B29C 63/0095; B29C 65/48; B29C 66/1122; B29C 66/472; B29C 66/83413; G02F 1/1303; G02F 2202/28
    USPC .. 156/64, 252, 253, 351, 360, 361, 378, 379
    See application file for complete search history.

(56) References Cited

FOREIGN PATENT DOCUMENTS

| JP | 2005-321582 A | 11/2005 |
| JP | 4361103 B | 11/2009 |
| JP | 4377965 B1 | 12/2009 |
| JP | 2011-85629 A | 4/2011 |
| JP | 2012-137695 A | 7/2012 |

OTHER PUBLICATIONS

International Search Report mailed Dec. 24, 2013 for PCT/JP2013/076469, citing the above reference(s).

* cited by examiner

F I G. 1
(a)
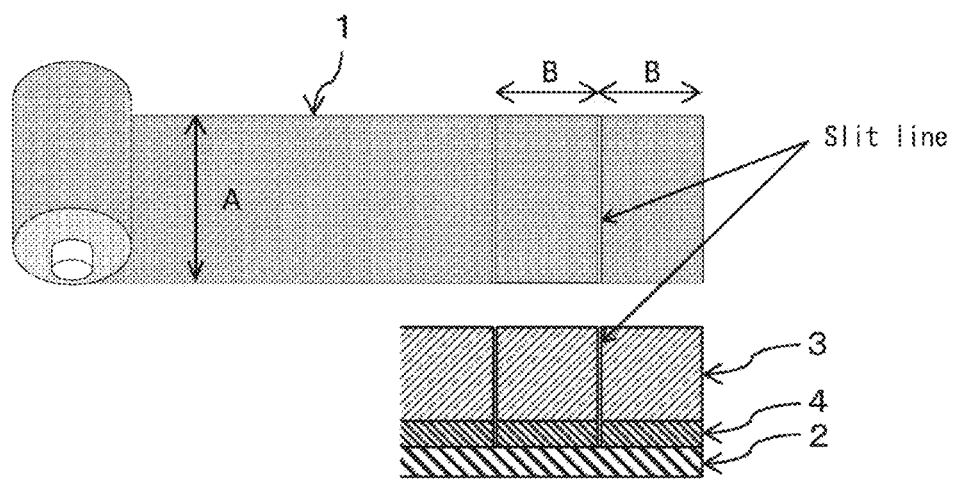
(b)
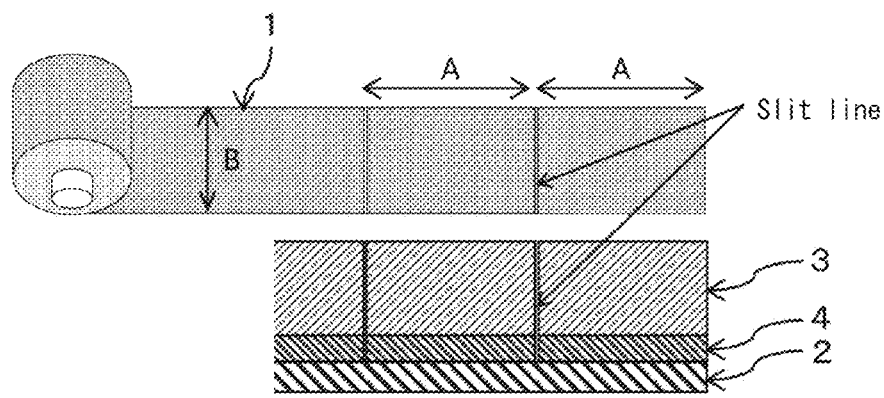
(c)
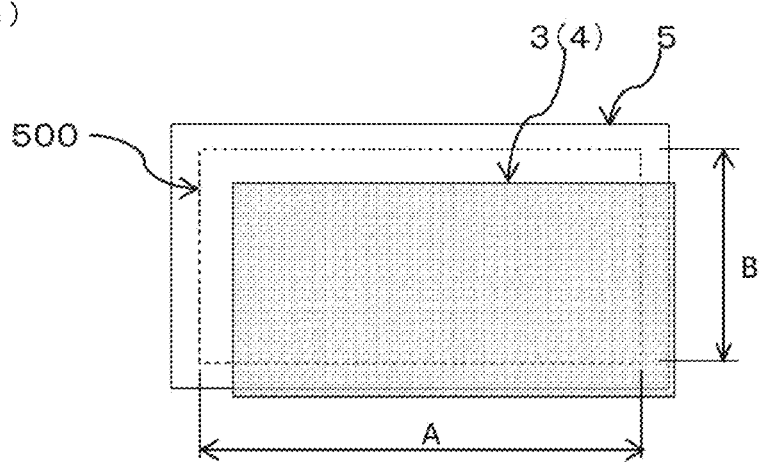

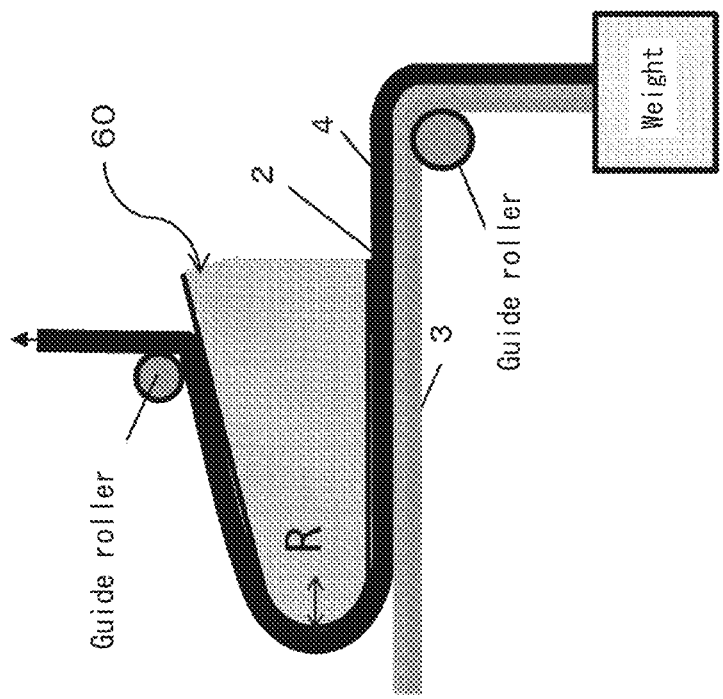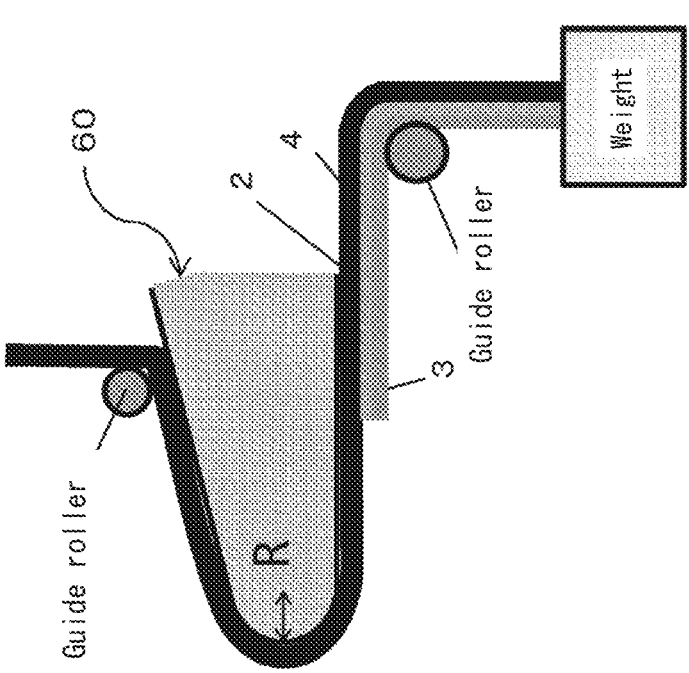
FIG. 11

F I G. 1 2

| Substrate | VEGQ1723NTB from Nitto Denko Corporation | CIG1484 CVAG350 from Nitto Denko Corporation | T-390 From Mitsubishi Plastics Inc |
|---|---|---|---|
| Thickness (μm) | 213 | 131 | 38 |
| Peeling rate (m/min) | 0.6 | 0.6 | 0.6 |
| R | | | |
| 25 | △× | | |
| 22.5 | ○ | | |
| 20 | | | |
| 17.5 | | | |
| 15 | | × | |
| 10 | | △× | |
| 7.5 | | ○ | |
| 6.5 | | ○ | |
| 5 | | | |
| 4 | | | × |
| 2 | | | △× |
| 1.5 | | | ○ |
| 1 | | | ○ |

○: Peelable
△×: Peelable but error occurred
×: Un-peelable

METHOD AND APPARATUS FOR MANUFACTURING OPTICAL DISPLAY DEVICE

CROSS REFERENCE TO RELATED APPLICATION

This application claims the priority of Japanese Patent Application No. 2012-224714, filed on Oct. 10, 2012, and Japanese Patent Application No. 2013-198000, filed on Sep. 25, 2013, in the JPO (Japan Patent Office). Further, this application is the National Phase application of International Application No. PCT/JP2013/076469 filed Sep. 30, 2013, which designates the United States and was published in Japanese.

TECHNICAL FIELD

The present invention relates to a method and an apparatus for manufacturing an optical display device. In particular, the present invention relates to a method and an apparatus for manufacturing an optical display device, the method and apparatus using a peeling member having a tip-end, for sequentially peeling a plurality of optical film sheets continuously supported via an adhesive layer on one of opposite surfaces of a carrier film together with the adhesive layer from the carrier film under peeling action of the peeling member by winding a long web of a carrier film in a state where the other of opposite surfaces thereof being folded to inside at the tip-end of the peeling member and the carrier film being passed around the peeling member; and laminating the plurality of optical film sheets to one of opposite surfaces of respective ones of panel components via the adhesive layer under laminating action of a laminating unit.

Patent Document 1 discloses a method and an apparatus using a peeling member having a tip-end, for peeling an optical film sheet supported on a carrier film together with an adhesive layer from the carrier film by winding a long web of a carrier film which one of opposite surfaces thereof being folded to inside at the tip-end of the peeling member, and laminating the plurality of optical film sheets to respective one of panel components. Referring to FIG. 3 of Patent Document 1, there is shown a plurality of optical film sheets Xα, Xβ continuously supported via an adhesive layer 12 on one of opposite surfaces of a carrier film 13, and referring to FIG. 9 of Patent Document 1, there is shown a part of an apparatus for winding a carrier film 13 to peel a plurality of optical film sheets Xα together with an adhesive layer 12 from the carrier film 13 and laminating the plurality of optical film sheets Xα to respective ones of panel components W under peeling action of a peeling member 201 at a lamination station B where an edge detecting unit 190 for detecting a leading end of the optical film sheet Xα at a tip-end of the peeling member 201 and a laminating unit 200 including lamination rollers are arranged.

Patent Document 2 also discloses a method and an apparatus using a peeling member having a tip-end, for peeling an optical film sheet having an adhesive layer supported on a carrier film from the carrier film by winding a long web of a carrier film which one of opposite surfaces thereof being folded to inside at the tip-end of the peeling member, and laminating the plurality of optical film sheets to respective ones of panel components. Referring to FIG. 5 and FIG. 6 of the Patent Document 2, there are shown a part of the apparatus for laminating a plurality of optical film sheets F to respective ones of panel components W by activating lamination rollers 25, 26, when a leading end of the optical film sheet F with an adhesive layer partially peeled from a carrier film S at a tip-end of a peeling member 14 is protruded from the tip-end of the peeling member 14 to establish so-called "head-out" state and a laminating position of the panel component W is overlapped to a part of the optical film sheet F.

Patent Document 3 discloses a method and an apparatus for detecting a position of an end of an optical film sheet (i.e., film piece) 5 with an adhesive surface formed on a carrier film (i.e., a releasing film) 6 included in an optical film laminate (i.e., a band-shaped film) 4 by a position detecting means 18, and correcting the position of the end of the optical film sheet 5 based on the detected positional information.

Recently, a market of liquid-crystal display devices has been significantly expanding, and there is a need for manufacturing and supplying high-quality liquid-crystal display devices in large lots. That is, in manufacturing of liquid-crystal display devices, a technique for laminating a panel component and an optical film sheet at high accuracy while maintaining cycle time required in a laminating process of the panel component and the optical film sheet is required. In particular, for middle- or small-sized liquid-crystal display devices which are referred as slate-PC, processing capacity higher than that for a manufacturing system of large-sized liquid-crystal display devices is required. A liquid-crystal (LC) cell for a television has a size of 18 inches (450 mm) even for a small one, and the size exceeds 60 inches (1500 mm) for a large one. Thickness of such LC cell is 1.4 mm which is 3 times or more than that of a LC cell for a slate-PC, and weight is 300 to 3,500 g. On the other hand, smartphones and tablet terminals are universally distributed as high-performance portable terminals with built-in battery. Those portable terminals are referred as slate-PCs, and in many cases, a middle- or small-sized liquid-crystal display device is used as an optical display device. A Liquid-crystal display panel used for a middle- or small-sized liquid-crystal display device in general is configured to include a LC cell with a size of about 5 to 10 inches (120 to 250 mm), a color filter (CF) arranged on a viewing side of a LC cell, and a thin-film transistor (TFT) arranged on a non-viewing side thereof, and thickness of a LC cell is about 0.5 mm and weight thereof is about 15 to 40 g.

For a manufacturing system of the middle- or small-sized liquid-crystal display devices used for such slate-PCs, processing capacity higher than that of a manufacturing system of liquid-crystal display device for a television is required. For example, a process of laminating an optical film sheet comprising a polarizing film to both of opposite surfaces of a liquid-crystal display panel requires laminating accuracy and manufacturing speed of two times higher than those of a manufacturing system of liquid-crystal display device for a television.

That is, in case of middle- or small-sized liquid-crystal display devices used in slate PCs, a liquid-crystal display panel LC used therefor is small and light as a size of the liquid-crystal display panel LC is about ⅓ to ⅕ and a weight thereof is less than 1/20 of those of a large liquid-crystal display device. A roll of an optical film laminate based on a long web of a carrier film supporting a plurality of optical film sheets to be laminated to respective one of liquid-crystal display panel LCs is also narrow in width and about ⅓ to 1/10 in weight. The roll is, for example, 500 mm in diameter, about 100 to 150 mm in width, and 30 to 70 kg in weight. Roll length of such an optical film laminate is about 900 m. However, manufacturing speed i.e., cycle time for such middle- or small-sized liquid-crystal display device is required to be two times higher than that for a large liquid-crystal display device, and laminating accuracy for an optical film sheet, such as a polarizing film supported on a carrier film, to be laminated to a liquid-crystal panel LC is also very severe.

A technical problem to be solved by the present invention is to achieve required laminating accuracy while maintaining cycle time required for laminating a panel component and an optical film sheet, and to provide a method and an apparatus for manufacturing an optical display device applicable to middle- or small-sized liquid-crystal display devices such as those used for slate-PCs.

A liquid-crystal display panel to be used as a panel component for a liquid-crystal display device of a slate PC is typically configured with, but not limited to, a liquid-crystal cell (LC) having two glass substrates with a liquid-crystal layer L filled therebetween, and a size of about 5 to 10 inches (120 to 250 mm), a thickness of about 0.5 mm and a weight of 15 to 40 g. Cycle time per a panel component is limited to some extent, and laminating accuracy allowed during the cycle time is at least within about±0.5 mm.

PRIOR ART DOCUMENTS

Patent Document 1: Japanese Patent No. 4377965B
Patent Document 2: Japanese Patent No. 4361103B
Patent Document 3: Japanese Laid-Open Patent Application No. 2004-333647A

DISCLOSURE OF THE INVENTION

Problem to be Solved by the Invention

An aim of the present invention is to provide a method and an apparatus for manufacturing an optical display device with high laminating accuracy, as mentioned above.

In order to achieve required laminating accuracy in manufacturing an optical display device, it is necessary to sequentially peel a plurality of optical film sheets continuously supported on one of opposite surfaces of the carrier film together with an adhesive layer from the carrier film under a winding action for a long web of the carrier film which the other of opposite surfaces thereof is folded to inside by abutting at a tip-end of a peeling member while making a part of the optical film sheet protruded from the tip-end of the peeling member, and to precisely match a part of a separately conveyed panel component with the part of the optical film sheet establishing a head-out state at a predetermined laminating position. As envisaged from Patent Documents 1 and 2, in order to satisfy the above-mentioned requirements, first of all, a leading end of the optical film sheet establishing the head-out state should be precisely positioned at the predetermined laminating position. Next, a panel component should be conveyed so as to match a part of the panel component, for example a lamination-start position thereof, with the leading end of the optical film sheet. Consequently, the panel component and the optical film sheet are laminated such that the optical film sheet appropriately fits to one of the opposite surfaces of the panel component.

However, it is not necessarily easy to detect and check the leading end of the optical film sheet to be positioned at the predetermined laminating position, and, based on positional information of the leading end, to appropriately correct the leading end position, to control conveyance of the panel component, and to make the optical film sheet appropriately fit to the one of the opposite surfaces of the panel component. Because, in many cases, accuracy of the positional information of the leading end varies depending on a location for detecting the leading end of the optical film sheet, or how close the location for detecting may be to the leading end of the optical film sheet. In order to reduce lamination error due to what is described in the above, for example, it is necessary to position the leading end of the optical film sheet at a detecting position provided on the peeling member where such error is hardly generated. Furthermore, an optical film sheet establishing the head-out state is prone to curl or droop at its leading end, it is necessary arrange the tip-end of the peeling member to a position in close proximity to the predetermined laminating position so as to minimize a head-out length of the optical film sheet. However, it is apparent that there is a limit for such arrangement due to positional relationship of the panel component with respect to a conveyance channel.

In optical display devices, for example middle- or small-sized liquid-crystal display devices used for slate-PCs, a protrusion length, i.e., a head-out length of a leading end of an optical film sheet is preferably about 5 to 100 mm, and more preferably 5 to 50 mm from a tip-end of a peeling member. Therefore, in order to reduce lamination error, the leading end of the optical film sheet needs to be precisely positioned at a predetermined laminating position.

Means for Solving the Problem

The above-mentioned technical problem may be solved by the following. Firstly, in order to avoid generating detecting error, a unwinding operation of a carrier film, in a state where one of opposite surfaces thereof is folded to inside at a tip-end of a peeling member and the carrier film is passed around the peeling member, is started after completing lamination of an optical film sheet and a panel component, and a leading end of the optical film sheet supported on the carrier film is appropriately positioned at a detecting position provided on the peeling member, then, the leading end of the optical film sheet is read, and an operation for winding the carrier film, i.e., winding amount of the carrier film is determined based on the read positional information of the leading end, thereby the optical film sheet is positioned at a predetermined laminating position while peeled from the carrier film. In this case, the winding amount of the carrier film is more preferably determined by considering lamination error caused by curling or drooping of the head-out portion of the leading end of the optical film sheet.

Embodiments of the present invention are as follows.

A first embodiment of the present invention is a method for manufacturing an optical display device 6 by sequentially peeling a plurality of optical film sheets 3 together with an adhesive layer 4 from a carrier film 2, the optical film sheets being continuously supported via the adhesive layer 4 on one of opposite surfaces of a long web of the carrier film 2 which configures an optical film laminate; and laminating the plurality of optical film sheets 3 to one of opposite surfaces of respective ones of a plurality of panel components 5 via the adhesive layer 4 by using a laminating unit 50 at a predetermined laminating position 100.

The method comprises a first step of, after completing lamination of a preceding optical film sheet 3 to one of opposite surfaces of a preceding panel component 5 at the predetermined laminating position 100, unwinding the carrier film 2 in a state where another surface thereof is folded to inside at a tip-end 61 configuring a head portion of a peeling member 60 and the carrier film is passed around the peeling member 60, and thereby backwardly feeding a leading end 31 of the optical film sheet 3 supported on the carrier film 2 to a predetermined feeding position 200 provided at upstream of the tip-end 61 of the peeling member 60.

The method further comprises a second step of operating a film leading end detecting means 70 when the leading end 31 of the optical film sheet 3 is unwound together with the carrier film 2 and stopped at the predetermined feeding position 200, to read the leading end 31 of the optical film sheet 3; and then, a third step of forwardly feeding the leading end 31 of the optical film sheet 3 to the predetermined laminating position 100, while peeling the optical film sheet 3 together with the adhesive layer 4 from the carrier film 2 by winding the carrier film 2. More particularly, the third step is a step for establishing a head-out state by gradually protruding the leading end 31 from the tip-end 61 of the peeling member 60 toward the predetermined laminating position 100 while peeling the optical film sheet 3.

The method further comprises a fourth step of forwardly feeding the panel component 5 to be laminated to the optical film sheet 3 from a predetermined waiting position 300 to the predetermined laminating position 100; and a fifth step of laminating the optical film sheet 3 and the panel component 5 via the adhesive layer 4 while further peeling the optical film sheet 3 together with the adhesive layer 4 from the carrier film 2, when the panel component 5 arrives at the leading end 31 of the optical film sheet 3 at the predetermined laminating position 100. The fifth step may be configured to match the leading end 31 of the optical film sheet 3 establishing a head-out state and a lamination-start position 500 of the panel component 5 at the predetermined laminating position 100 when the panel component 5 arrives at the leading end 31 of the optical film sheet 3.

In the first embodiment, the laminating unit 50 may also be configured from open/close lamination rollers 51, 52 provided to open/close in upward/downward direction. In that case, the first step may further comprises a step of switching the laminating unit 50 to non-active and opening the lamination rollers 51, 52 in upward/downward direction; thus, the second step may further comprises a step of reading the leading end 31 of the optical film sheet 3 through a space 400 formed between the lamination rollers 51, 52; and thus, the fifth step may further comprises a step of closing the lamination rollers 51, 52 in upward/downward direction and switching the laminating unit 50 to active, thereby the optical film sheet 3 and the panel component 5 may be laminated via the adhesive layer 4 while further peeling the optical film sheet 3 together with the adhesive layer 4 from the carrier film 2.

In the first embodiment, in a case where the lamination rollers 51, 52 are provided to open/close in upward/downward direction, the first step may further comprises a step of switching the laminating unit 50 to non-active and opening the lamination rollers 51, 52 in upward/downward direction; thus, the second step may further comprises a step of moving the film leading end detecting means 70 to a space 400 formed between the lamination rollers 51, 52 and operating the film leading end detecting means 70 to read the leading end 31 of the optical film sheet 3; and thus, the fifth step may further comprises a step of retracting the film leading end detecting means 70 from the space 400, closing the lamination rollers 51, 52 in upward/downward direction and switching the laminating unit 50 to active, thereby the optical film sheet 3 and the panel component 5 may be laminated via the adhesive layer 4 while further peeling the optical film sheet 3 together with the adhesive layer 4 from the carrier film 2.

In the first embodiment, the second step may further comprises a step of forwardly or backwardly feeding the leading end 31 of the optical film sheet 3 supported on the carrier film 2 by winding or unwinding the carrier film 2 based on the positional information 310 of the leading end 31 read by the film leading end detecting means 70 to further position the leading end 31 of the optical film sheet 3 at a predetermined feeding position 200. More particularly, it is a step of forwardly or backwardly feeding the leading end 31 of the optical film sheet 3 when the leading end 31 of the optical film sheet 3 supported on the carrier film 2 stops at a position not arriving at the predetermined feeding position 200 or at a position exceeding the predetermined feeding position 200, so as to correct deviation (δ) of the leading end 31 from the predetermined feeding position 200.

In the first embodiment, the first, the third and the fifth steps are preferably configured to operate a carrier film feeding means 8 comprising forward/reverse feed rollers 80, 81 arranged at upstream and at downstream of the tip-end 61 of the peeling member 60 to wind or unwind the carrier film 2 without slacking the carrier film 2.

In the first embodiment, the second step may be configured to read opposing edges 311, 312 of a leading end face 31 of the optical film sheet 3 which is orthogonal to a feeding direction of the carrier film 2.

In the first embodiment, the film leading end detecting means 70 comprises a plurality of imaging devices 71, 72 having a measurement reference specifying a position of each of the opposing edges 311, 312 of leading end face 31 of the optical film sheet 3, and the second step may further comprise a step of operating the imaging devices 71, 72 to specify the positions of the opposing edges 311, 312 based on the measurement reference 700.

In the first embodiment, the fourth step may further comprise a step of detecting the panel component 5 conveyed to the predetermined waiting position 300. More particularly, a panel component detecting means 91 arranged at the predetermined waiting position 300 may be operated to detect the panel component 5 at the predetermined waiting position 300.

In the first embodiment, the fourth step may further comprise a step of adjusting position and posture of the panel component 5 at the predetermined waiting position 300. More particularly, it is a step of operating a panel component position adjusting device arranged at the predetermined waiting position 300 to pre-adjust the position and the posture of the panel component 5 conveyed to the predetermined laminating position 100 by panel component conveying unit 90 at the predetermined waiting position 300, i.e., a step of aligning the panel component 5.

In the first embodiment, the fourth step preferably further comprises a step of synchronizing the panel component 5 forwardly fed to the predetermined laminating position 100 with the optical film sheet 3 forwardly fed to the predetermined laminating position 100.

A second embodiment of the present invention is an apparatus 10 for manufacturing an optical display device 6 by sequentially peeling a plurality of optical film sheets 3 together with an adhesive layer 4 from a carrier film 2, the optical film sheets being continuously supported via the adhesive layer 4 on one of opposite surfaces of a long web of the carrier film 2 which configures an optical film laminate; and laminating the plurality of optical film sheets 3 to one of the opposite surfaces of respective ones of a plurality of panel components 5 via the adhesive layer 4 at a predetermined laminating position 100.

The apparatus 10 is configured with units as follows. The apparatus 10 comprises: a laminating unit 50 operating to laminate the optical film sheet 3 on one of opposite surfaces of the panel component 5 via the adhesive layer 4 at the predetermined laminating position 100; a peeling member 60 acting to forwardly feed the optical film sheet 3 to the predetermined laminating position 100 while peeling the optical film sheet 3 together with the adhesive layer 4 from the carrier film 2 by winding the carrier film 2, the peeling member having a tip-end 61 and comprising a head portion where another surface of the carrier film 2 is folded to inside and a body where the carrier film 2 is passed around; a film leading end detecting unit 70 operating to read a leading end 31 of the optical film sheet 3 supported on the carrier film 2 backwardly fed to a predetermined feeding position 200 provided at upstream of the tip-end 61 of the peeling member 60, by unwinding the carrier film 2 in a state where another surface thereof is folded to inside at a tip-end 61 configuring the head portion of the peeling member 60 and the carrier film is passed around the peeling member 60; a carrier film feeding unit 8 interlockingly operating to wind or unwind the carrier film 2 without slacking the carrier film 2 in a state where another surface thereof is folded to inside at a tip-end 61 and the carrier film is passed around the peeling member 60; and a panel component conveying unit 90 operating to forwardly feed the panel component 5 to be laminated to the optical film sheet 3 from a predetermined waiting position 400 to the predetermined laminating position 100; the apparatus 10 further comprises a control means 800 for associating and operating each of the laminating unit 50, the film leading end detecting unit 70, the carrier film feeding unit 8 and the panel component conveying unit 90 to laminate the optical film sheet 3 and the panel component 5 via the adhesive layer 4 while further peeling the optical film sheet 3 together with the adhesive layer 4 from the carrier film 2, when, at the predetermined laminating position 100, the panel component 5 conveyed to the predetermined laminating position 100 arrives at the leading end 31 of the optical film sheet 3 which is peeled together with the adhesive layer 4 from the carrier film 2 under peeling action of the peeling member 60 and forwardly fed. The control means 800 may also control a leading end 31 of the optical film sheet 3 establishing a head-out state and a lamination-start position 500 of the panel component 5 to match at the predetermined laminating position 100, when the panel component 5 arrives at the leading end 31 of the optical film sheet 3.

In the second embodiment, the apparatus 10 may be configured with the laminating unit 50 having a pair of open/close lamination rollers 51, 52 provided to open/close in upward/downward direction. In the apparatus 10, after completing lamination of a preceding optical film sheet 3 and a preceding panel component 5, the laminating unit 50 is switched to non-active and the lamination rollers 51, 52 are opened in upward/downward direction, then the film leading end detecting unit 70 is operated to read the leading end 31 of the optical film sheet 3 supported on the carrier film 2 through a space 400 formed between the lamination rollers 51, 52; and the lamination rollers 51, 52 are closed in upward/downward direction and the laminating unit 50 is switched to active when, at the predetermined laminating position 100, the panel component 5 arrives at the leading end 31 of the optical film sheet 3 peeled together with the adhesive layer 4 from the carrier film 2 and forwardly fed to the predetermined laminating position 100, thereby the optical film sheet 3 and the panel component 5 are laminated via the adhesive layer 4 while the optical film sheet 3 is further peeled together with the adhesive layer 4 from the carrier film 2. The control means 800 may also control the leading end 31 of the optical film sheet 3 establishing a head-out state and a lamination-start position 500 of the panel component 5 to match at the predetermined laminating position 100 when the panel component 5 arrives at the leading end 31 of the optical film sheet 3.

In the second embodiment, the apparatus 10 may be configured with the open/close lamination rollers 51, 52 provided to open/close in upward/downward direction and the film leading end detecting unit 70 equipped with a moving unit 73. In the apparatus 10, the film leading end detecting unit 70 is moved by the moving unit 73 to a space 400 formed between the lamination rollers 51, 52 opened in upward/downward direction, and is operated to read the leading end 31 of the optical film sheet 3 supported on the carrier film 2; and the film leading end detecting unit 70 is retracted from the space 400 by the moving unit 73, the lamination rollers 51, 52 are closed in upward/downward direction, and the laminating unit 50 is switched to active, when, at the predetermined laminating position 100, the panel component 5 arrives at the leading end 31 of the optical film sheet 3 peeled together with the adhesive layer 4 from the carrier film 2 and forwardly fed to the predetermined laminating position 100, thereby the optical film sheet 3 and the panel component 5 are laminated via the adhesive layer 4 while the optical film sheet 3 is further peeled together with the adhesive layer 4 from the carrier film 2 under peeling action of the peeling member 60. The control means 800 may also control the leading end 31 of the optical film sheet 3 establishing a head-out state and a lamination-start position 500 of the panel component 5 to match at the predetermined laminating position 100, when the panel component 5 arrives at the leading end 31 of the optical film sheet 3.

In the second embodiment, the carrier film feeding unit 8 may be operated based on the positional information 310 of the leading end 31 read by the film leading end detecting unit 70 such that the leading end 31 of the optical film sheet 3 supported on the carrier film 2 is further positioned at the predetermined feeding position 200 by forwardly or backwardly feeding the leading end 31 by winding or unwinding the carrier film 2. More particularly, in the apparatus 10, the leading end 31 of the optical film sheet 3 is forwardly or backwardly fed, when the leading end 31 of the optical film sheet 3 supported on the carrier film sheet 2 does not arrive at the predetermined feeding position 200 or exceeds the predetermined feeding position 200, to correct deviation (δ) of the leading end 31 from the predetermined feeding position 200.

In the second embodiment, the carrier film feeding unit 8 may comprise forward/reverse feed rollers 80, 81 respectively arranged at least at upstream and at downstream of the tip-end 61 of the peeling member 60. In this case, in the carrier film feeding unit 8 configured with the forward/reverse feed roller 80, a peeling member 60 and another forward/reverse feed roller 81, a dancer roller 82 may be also arranged between the forward/reverse feed roller 80 and the peeling member 60 and cooperatively operated with the another forward/reverse feed roller 81 to wind or unwind the carrier film 2 without slacking.

In the second embodiment, there is arranged a film leading end detecting unit 70 comprising a plurality of imaging devices 71, 72 having a measurement reference 700 at locations corresponding to the opposing edges 311, 312 of a leading end face 31 of the optical film sheet 3 orthogonal to a feeding direction of the carrier film 2, and the film leading end detecting unit 70 may operate the imaging devices 71, 72 to read the opposing edges 311, 312 of the leading end face 31 of the optical film sheet 3 to specify the positions of the opposing edges 311, 312 of the leading end 31 of the optical film sheet 3 based on the measurement reference 700.

In the second embodiment, a panel component detecting unit 91 for detecting the panel component 5 may be arranged at a predetermined waiting position 300, and the control means 800 may operate the panel component detecting unit 91 to detect the panel component 5 conveyed to the predetermined waiting position 300.

In the second embodiment, a panel component position adjusting unit 92 may be arranged at the predetermined waiting position 300, and the control means 800 may operate the panel component position adjusting unit 92 to pre-adjust position and posture of the panel component 5 conveyed to the predetermined laminating position 100 by the panel component conveying unit 90 at the predetermined waiting position 300.

In the second embodiment, the control means 800 may further comprise means for interlockingly operating the panel component conveying unit 90 and the carrier film feeding unit 8 to synchronize the panel component 5 forwardly fed to the predetermined laminating position 100 and the optical film sheet 3 forwardly fed.

BRIEF DESCRIPTION OF THE DRAWINGS

FIG. 1 illustrates top views and side views showing an example of an optical film laminate comprising a plurality of continuous optical film sheets together with an adhesive layer on a long web of a carrier film. Each of FIGS. 1(a) and (b) shows an example of the optical film laminate in which a plurality of optical film sheets continuously supported are formed by forming a plurality of slit lines on the optical film laminated together with an adhesive layer on one of opposite surfaces of a long web of the carrier film which has a width corresponding to a long side or a short side of a rectangular panel component. FIG. 1(c) is a schematic diagram illustrating positional relationship between a panel component and an optical film sheet where a lamination-start position of the panel component is matched with a leading end of an optical film sheet.

FIG. 3(a) is a schematic diagram showing a side view of a carrier film feeding mechanism for winding or unwinding a long web of a carrier film 2 via a peeling member having a tip-end. It also shows a film leading end detecting unit for reading a leading end of an optical film sheet immediately before being laminated to a panel component and a panel component conveying unit for conveying panel components from a predetermined waiting position to a predetermined laminating position. FIG. 3(b) is an enlarged schematic diagram showing a side view of positional relationship between lamination rollers and a tip-end configuring a peeling member at a predetermined laminating position.

FIG. 7(a) is an enlarged view showing a state where a film leading end detecting unit reads a leading end of an optical film sheet through a space formed between lamination rollers opened in upward/downward direction. FIG. 7(b) is an enlarged view showing a state where a film leading end detecting unit is moved to a space formed between lamination rollers opened in upward/downward direction to read a leading end of an optical film sheet.

FIG. 11 is a diagram representing one example of an experimental system for determining radius of curvature R of cross-sectionally arc-shaped surface of a peeling member based on a relative relationship between flexural reactive force of a substrate depending on a thickness of an experimental substrate which corresponds to an optical film sheet, and a peeling force of a carrier film against an adhesive layer on the substrate.

FIG. 12 is a table showing experiment results on samples of substrates with an adhesive layer, the substrate having a width of 50 mm and three different thicknesses.

BEST MODE FOR IMPLEMENTING THE INVENTION (Overview of a Method and an Apparatus for Manufacturing an Optical Display Device)

Figure 2:
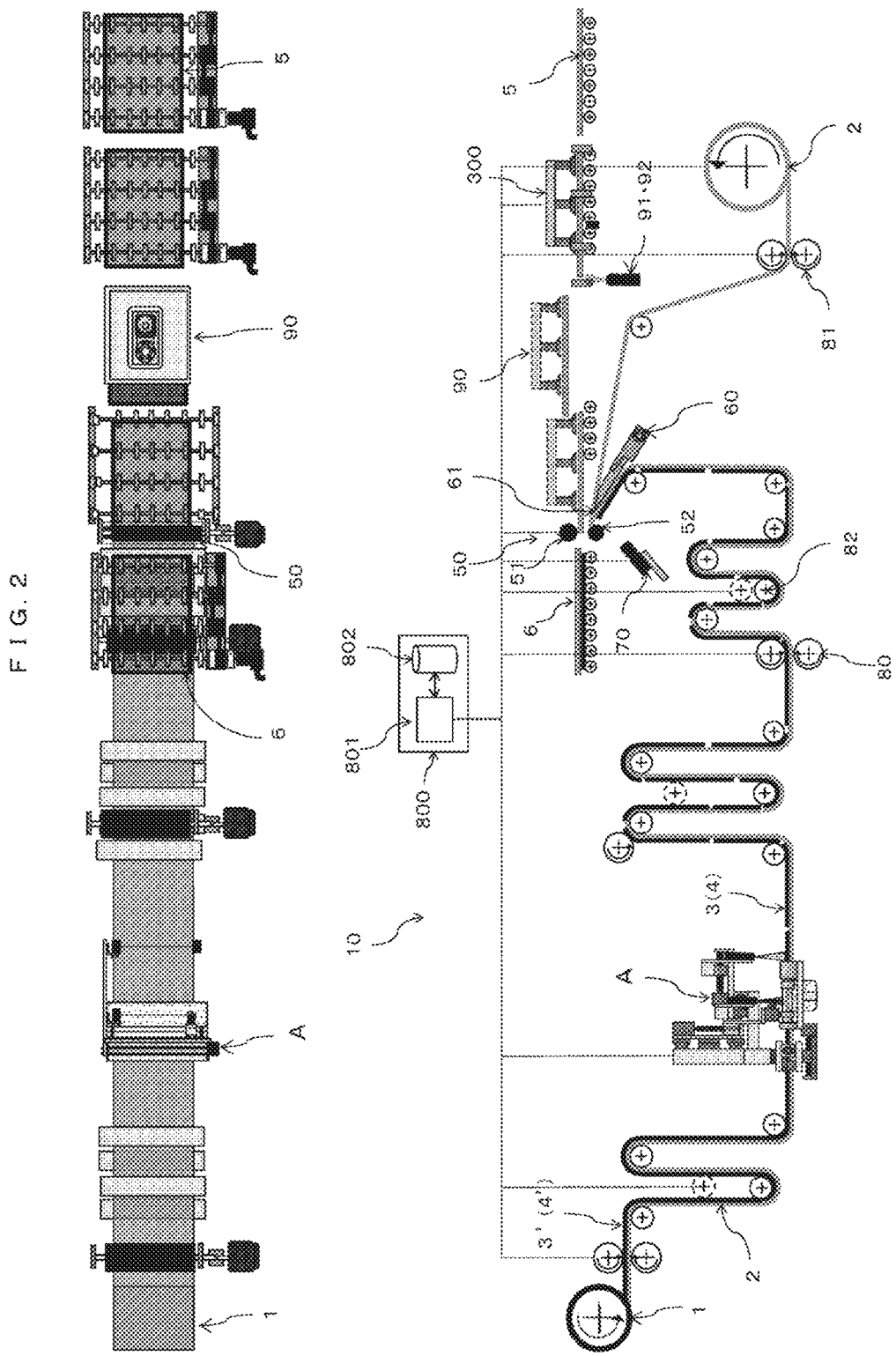
FIG. 2 illustrates a top view and a side view showing an entire apparatus used in an embodiment of the present invention for manufacturing an optical display device by laminating an optical film sheet and a panel component with a lamination unit including lamination rollers at a predetermined laminating position.

FIG. 2 illustrates a top view and a side view showing an entire apparatus 10 for manufacturing an optical display device 6 by laminating an optical film sheet 3 and a panel component 5 at a predetermined laminating position 100. As shown in FIG. 1, the optical film sheet 3 including an adhesive layer 4 is formed by forming a plurality of slit lines on an optical film 3' laminated together with an adhesive layer 4' on one of opposite surfaces of a long web of a carrier film 2 which configures an optical film laminate 1 with a width corresponding to a long side or a short side of the rectangular panel component 5.

The apparatus 10 used in an embodiment of the present invention may be, for example but not limited to, an apparatus configuring a part of a manufacturing system of liquid-crystal display devices for slate-PCs. The manufacturing system has, but not limited to, a linear channel and dimension of the channel is assumed as about 210 to 550 mm in width and about 5000 to 6000 mm in length. Preferably, the linear channel is configured for a height where an operator can visually identify panel components 5 fed from a right end of the channel, a roll R of the optical film laminate 1 can be mounted at a left end of the channel, and the operator can visually identify a slitting unit A forming a plurality of slitting lines in the optical film 3' to continuously form a plurality of optical film sheets 3 with the adhesive layer 4 on one of opposite surfaces of a long web of the carrier film 2 which configures the optical film laminate 1. Such height may be from about 1000 to 1500 mm, and an overall height of the apparatus may be about 2500 mm. The slitting unit A may be omitted when using an optical film laminate 1 in which optical film sheets 3 with an adhesive layer 4 are preliminary formed on one of opposite surfaces of a long web of carrier film 2.

The apparatus 10 is arranged in a clean room as well-known to those skilled in the art. In a clean room, it is preferable that the manufacturing system is covered with a box-type housing with an operable door or window to maintain high-level cleanness in order to eliminate, as much as possible, adhesion of dirt etc. brought by workers and/or operators to the adhesive layer 4 of the optical film sheet 3 to be laminated to one or both surfaces of the panel component 5. From such view point, it is more preferable to arrange the channel in a hierarchical structure to prevent the panel components 5 passing over the optical film laminate 1 and further to locate the predetermined laminating position 100 to satisfy both of positional arrangements for feeding the optical film sheets 3 continuously supported on the carrier film 2 and for feeding of the panel components 5, to provide an optimal configuration which can be housed in the box-type housing in an arrangement allowing for exerting satisfying performance.

Figure 3:
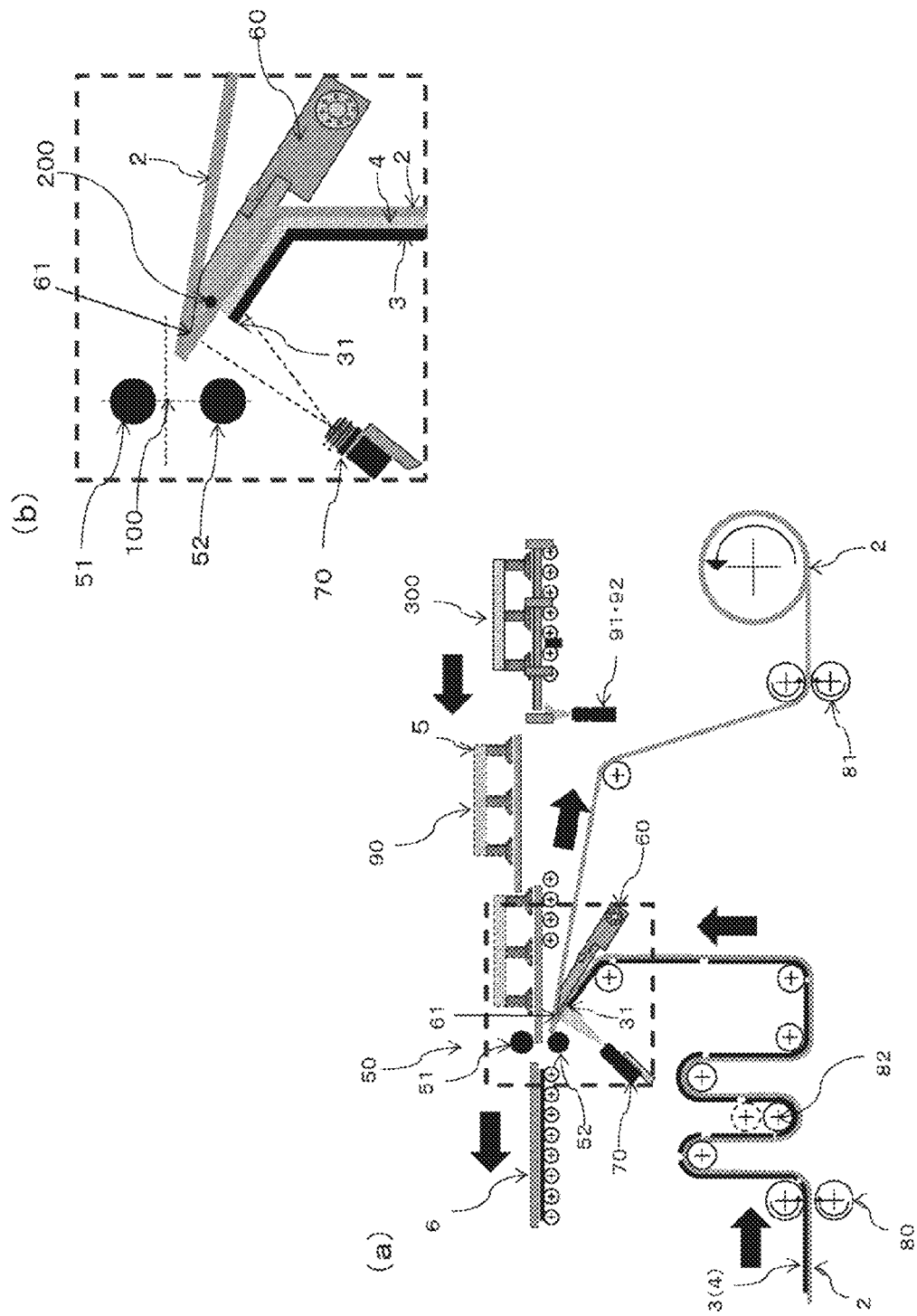
FIG. 3 illustrates enlarged views of a predetermined laminating position 100 where a laminating unit including lamination rollers shown in FIG. 2 is arranged.
Figure 4:
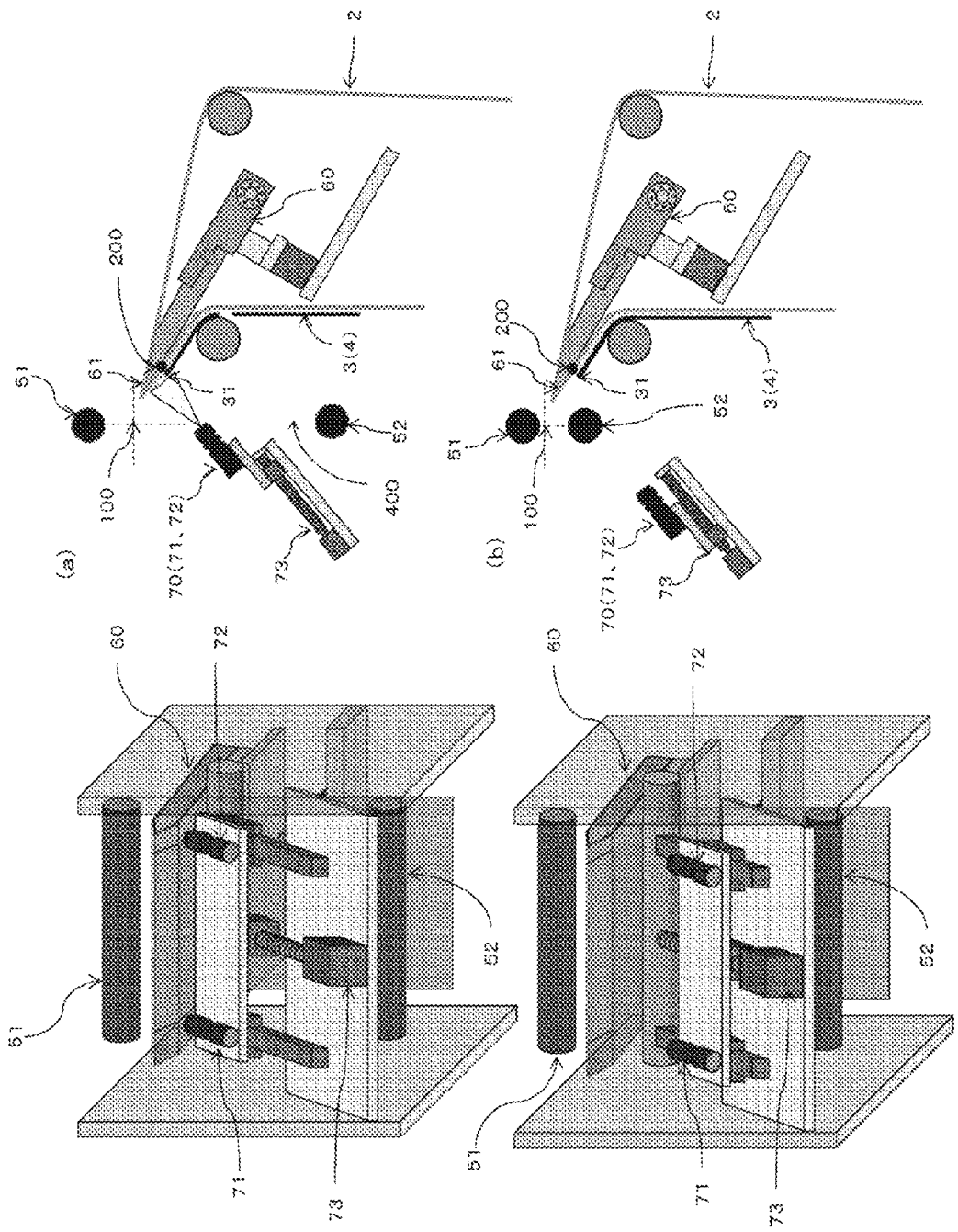
FIG. 4 illustrates perspective views showing a film leading end detecting unit provided with two imaging units having a measurement reference arranged at positions corresponding to opposing edges of a leading end of an optical film sheet orthogonal a feeding direction of a carrier film, and schematic diagrams (a) and (b) showing enlarged side views of positional relationship between lamination rollers and a tip-end of a peeling member at predetermined laminating positions corresponding to the perspective views (a) and (b).

FIG. 3 is schematic diagram showing relationships between each of units disposed at upstream or downstream of a predetermined laminating position 100 where a laminating unit 50 including lamination rollers 51 and 52 which configures the apparatus 10 shown in FIG. 2 is arranged. FIG. 3(a) shows a mechanism for winding or unwinding a long web of the carrier film 2 via a peeling member 60 having a tip-end 61, i.e., a carrier film feeding mechanism, as will be described later. As will be described in detail later, the optical film sheets 3 are continuously supported together with the adhesive layer 4 on the carrier film 2 which is in a state where another surface thereof is folded to inside at a tip-end 61 configuring a head portion of the peeling member 60 and passed around the peeling member 60. FIG. 3(a) also shows a film leading end detecting unit 70 for reading a leading end 31 of the optical film sheet 3 immediately before being laminated to a panel component 5 and a panel component conveying unit 90 for conveying the panel component 5 from a predetermined waiting position 300 to the predetermined laminating position 100.

FIG. 3(b) is an enlarged schematic diagram showing positional relationship between the lamination rollers 51, 52 and the peeling member 60 having the tip-end 61 at the predetermined laminating position 100. FIG. 3(b) also shows positional relationship between the lamination rollers 51, 52 and a film leading end detecting unit 70 for reading the leading end 31 by positioning the leading end 31 of the optical film sheet 3 supported on the carrier film 2 in a state of being passed around the peeling member 60 at a predetermined feeding position 200 provided on the peeling member 60.

FIG. 1(c) is a schematic diagram showing positional relationship between the optical film sheet 3 and the panel component 5 at the predetermined laminating position 100 where a lamination-start position 500 of the panel component 5 is matched to the leading end 31 of the optical film sheet 3 establishing a head-out state from the tip-end 61, as will be described later. For example, firstly, an action to accurately read the leading end 31 of the optical film sheet 3 should be surely done in order to match, without any deviation, the leading end 31 of the optical film sheet 3 in which a head-out state of preferably 5 to 100 mm and more preferably 5 to 50 mm from the tip-end 61 of the peeling member 60 is established under peeling action of the tip-end 61 of the peeling member 60 with the lamination-start position 500 of the panel component 5 being conveyed. Then, winding amount of the carrier film 2 based on the read positional information 310 of the leading end 31, and timing and amount for conveying the panel component 5 should be controlled.

Figure 5:
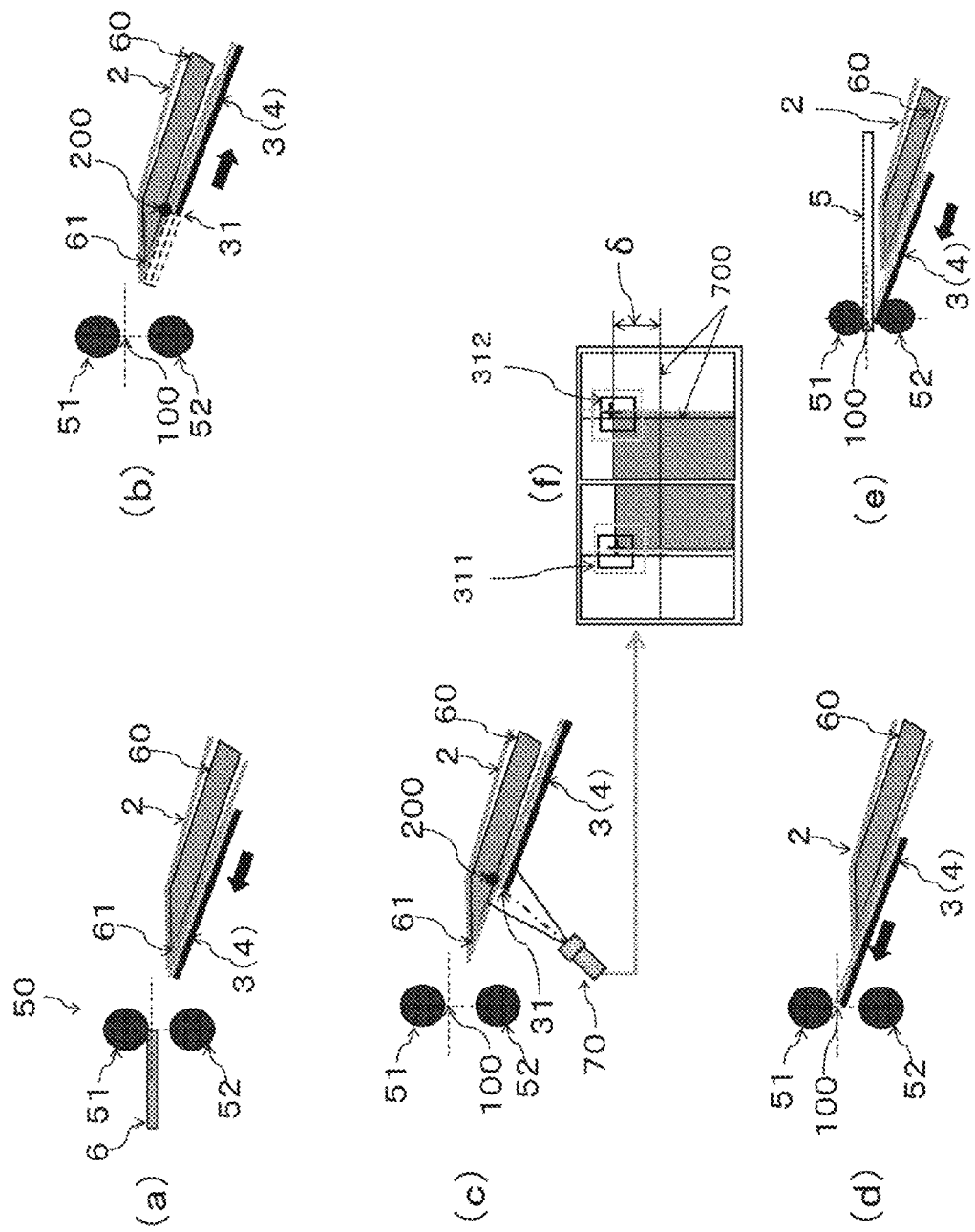
FIG. 5 illustrates schematic diagrams showing operation steps of a leading end of an optical film sheet at a predetermined laminating position in FIG. 2 and at a predetermined feeding position.

The method for manufacturing an optical display device 6 according to the present invention is characterized by operation steps (a) to (e) of the leading end 31 of the optical film sheet 3 at each of the predetermined laminating position 100 and the predetermined feeding position 200 provided on the peeling member 60, shown in FIG. 5.

The operation step (a) represents a state immediately after lamination of preceding optical film sheet 3 and panel component 5. As is clear therefrom, the lamination rollers 51, 52 grip a rear end portion of a preceding optical display device 6 immediately after the lamination. One the other hand, an optical film sheet 3, supported on a carrier film 2 in a state where the carrier film 2 is passed around the peeling member 60 and to be laminated next to a panel component 5, is positioned on the peeling member 60 together with an adhesive layer 4 with its leading end 31 retained at the tip-end 61 of the peeling member 60.

The operation step (b) shows a back-feeding operation for backwardly feeding the leading end 31 of the optical film sheet 3 supported on the carrier film 2, the leading end 31 being retained at the tip-end 61 of the peeling member 60 to a predetermined feeding position 200 provided on the peeling member 60 by temporarily unwinding without slacking the carrier film 2 in a state being passed around the peeling member 60.

Although reason for why the back-feeding operation is necessary will be described in detail later, deference of tension of the carrier film 2 is generated between upstream and downstream of the tip-end 61 of the peeling member 60 immediately after lamination. Due to the difference, an error in stroke of the optical film sheet 3 establishing a head-out state is prone to be generated. Therefore, it is necessary to make the tension of the carrier film 2 at upstream and at downstream of the tip-end 61 of the peeling member 60 as equal. It is also assumed that peeling force f for peeling an optical film sheet 3 from a carrier film 2 when manufacturing a preceding optical display device 6 is total of tensile force f1 exerted on the optical film sheet 3 by the lamination rollers 51, 52 and tensile force f2 required to peel the optical film sheet 3 from the carrier film 2 by winding the carrier film 2. However, peeling force f3 for peeling an optical film sheet 3 establishing a head-out state is only a tensile force required to peel the optical film sheet 3 from the carrier film 2 by winding the carrier film 2. Naturally, since f3>f2, excessive tension is exerted on the carrier film 2 as being folded back when the leading end 31 of the optical film sheet 3 is peeled therefrom. Then, it is presumed as that it will become more difficult to precisely stroke the optical film sheet 3 when the head-out state is established.

The operation step (c) shows an operation by a film leading end detecting unit 70 for reading the leading end 31 of the optical film sheet 3 positioned by the back-feeding operation at the predetermined feeding position 200 provided on the peeling member 60.

There are two selectable methods for back-feeding operation. One of the methods is a back-feeding operation to backwardly feed the leading end 31 of the optical film sheet 3 without considering a predetermined feeding position 200. This method to back-feed without considering the predetermined feeding position 200 may include two ways, i.e., a way in which the leading end 31 is back-fed within an imaging range as shown in FIG. 5(*f*), or a way in which the leading end 31 is back-fed over the imaging range and then fed toward the imaging range by winding a carrier film 2. In either case, it is a way to backwardly feed the leading end 31 of the optical film sheet 3 in one stroke toward the predetermined feeding position 200 and to stop thereat.

The other method is a back-feeding operation to backwardly feed the leading end 31 of the optical film sheet 3 gradually toward the predetermined feeding position 200. In this back-feeding operation, however, it is confirmed by a film leading end detecting unit 70 whether or not the leading end 31 of the optical film sheet 3 is properly positioned at the predetermined feeding position 200. When it is confirmed as there is deviation (δ) between the leading end 31 of the optical film sheet 3 and the predetermined feeding position 200 as shown in FIG. 5(*f*), fine adjustment should be done by winding or unwinding the carrier film 2 to forwardly or backwardly feed the leading end 31.

The operation step (d) shows a feeding operation in which the leading end 31 of the optical film sheet 3 properly positioned at the predetermined feeding position 200 provided on the peeling member 60 is peeled together with the adhesive layer 4 from the carrier film 2 to forwardly feed the leading end 31 to the predetermined laminating position 100 by winding the carrier film 2. Since the carrier film 2 is unwound by the back-feeding operation in the operation step (c), difference of tension of the carrier film 2 is hardly generated between at upstream and at downstream of the tip-end 61 of the peeling member 60 when a feeding operation is started. By this, the leading end 31 of the optical film sheet 3 is fed to the predetermined laminating position 100 in a proper stroke to establish a head-out state. A head-out length by the feeding operation, which is a distance between the tip-end 61 and the predetermined laminating position 100, is preferably about 5 to 100 mm and more preferably about 5 to 50 mm from the tip-end 61 of the peeling member 60. An entire stroke will be a sum of the head-out length and a head-out length between the predetermined feeding position 200 and the tip-end 61, e.g., about another 5 to 10 mm.

Next, as shown in the operation step (e), a panel component 5 is conveyed to the predetermined laminating position 100, and when a lamination-start position 500 of the panel component 5 is matched with the leading end 31 of the optical film sheet 3 establishing a head-out state, the optical film sheet 3 and the panel component 5 are laminated via the adhesive layer 4 while the optical film sheet 3 is peeled from the carrier film 2 together with the adhesive layer 4 under peeling action of the peeling member 60. To this end, a control unit 800 of the apparatus 10, as is clear from the flow chart in FIG. 6, associates and controls a laminating operation of a laminating unit 50, an operation of a film leading end detecting unit 70, an operation of winding or unwinding a carrier film 2 by forward/reverse feed rollers 80, 81, and an operation of a panel component conveying unit 90. Besides the forward/reverse feed rollers 80, 81, a dancer roller etc. may be used as a carrier film feeding unit 8, or the forward/reverse feed rollers 80, 81 and a dancer roller may be used in combination.

Figure 6:
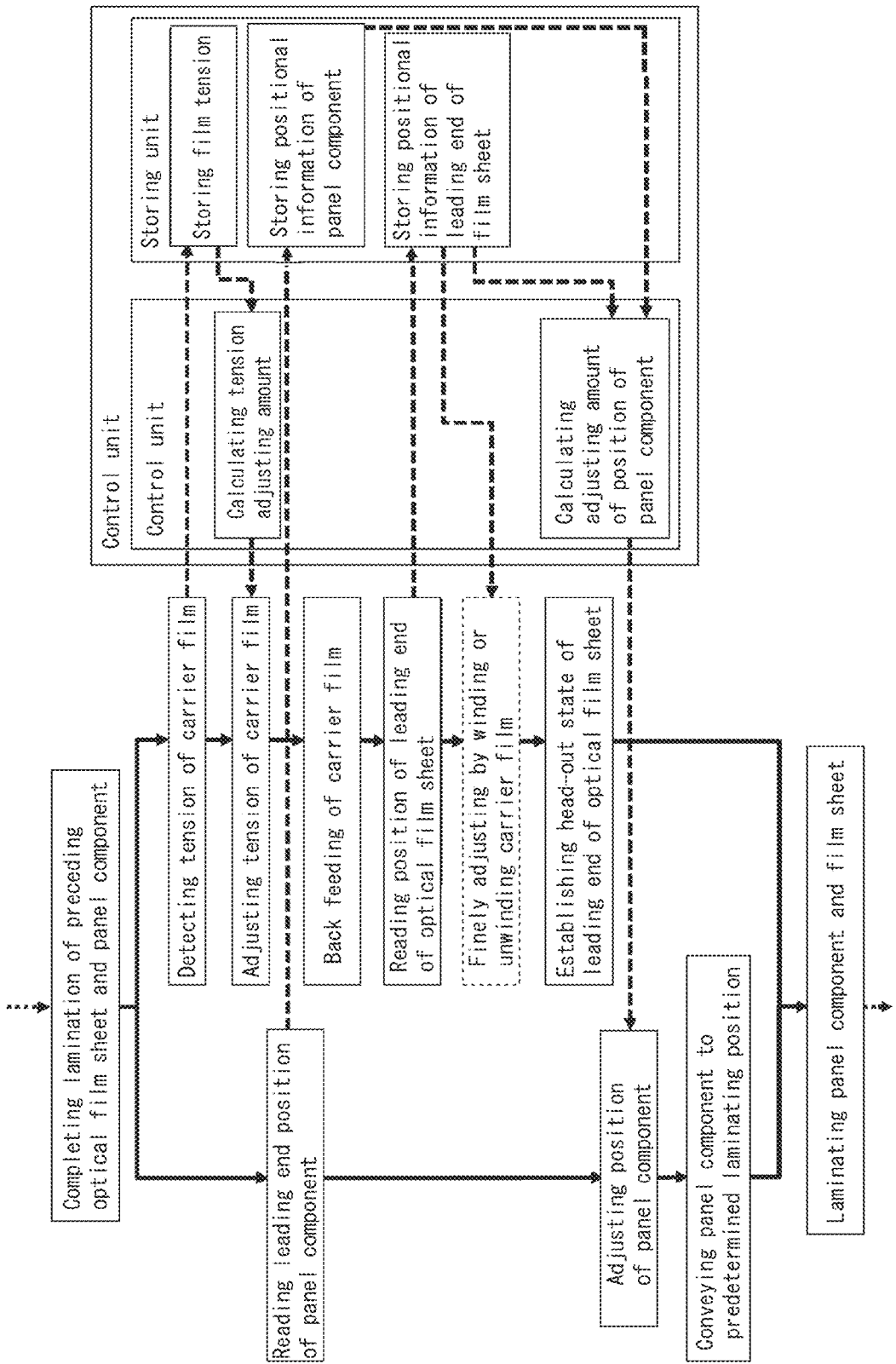
FIG. 6 illustrates a control flow chart representing a manufacturing process of an apparatus for manufacturing an optical display device using a lamination unit shown in FIG. 3.

The flow chart in FIG. 6 is an example of controlling methods describing in detail controls carried out by the control unit 800 between the operation step (c) where the leading end 31 of the optical film sheet 3 is positioned at the predetermined feeding position 200 by the back-feeding operation of the carrier film 2 and the operation step (e) where the panel component 5 is conveyed to the predetermined laminating position 100 to match the lamination-start position 500 of the panel component 5 with the leading end 31 of the optical film sheet 3 establishing a head-out state. More particularly, "switching laminating unit to non-active" (not shown) is carried out after "completing lamination of preceding optical film sheet and panel component". Further, after detecting and adjusting of tension of the carrier film 2, the back-feeding operation of the carrier film 2 is carried out. Then, after reading the leading end 31 of the optical film sheet 3, positioning the leading end 31 to the predetermined feeding position 200 and appropriately fine-adjusting the leading end 31 by winding or unwinding the carrier film 2, based on the positional information 310 of the leading end 31, "establishing a head-out state of leading end of optical film sheet" and "conveying panel component to a predetermined laminating position" are carried out. Finally, "laminating panel component and optical film sheet" is carried out by "switching laminating unit to active" (not shown).

Since radius of curvature R of a tip-end 61 of a peeling member 60 may affect a peeling force of an optical film sheet 3, and may also generate difference of tension of the carrier film 2 folded back at the tip-end 61 between at upstream and at downstream thereof, proper value of R later described in FIG. 10 to FIG. 13 is required.

(Overview of a Method and an Apparatus for Manufacturing an Optical Display Device Using Lamination Rollers Configured to Open/Close in Upward/Downward Direction)

Figure 8A:
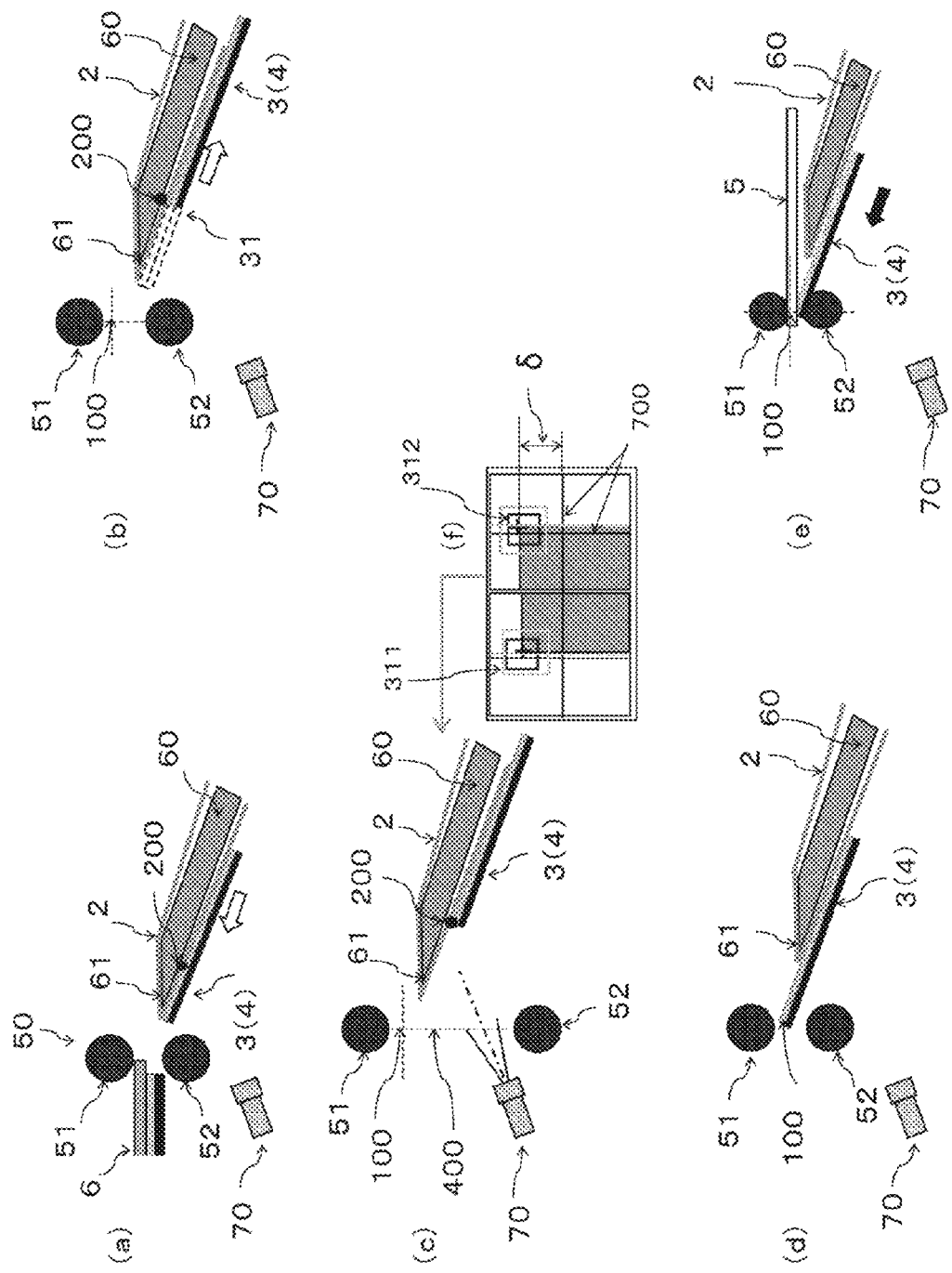
FIG. 8A illustrates schematic diagrams showing each of operation steps of a leading end of an optical film at a predetermined laminating position corresponding to FIG. 7(a) at a predetermined feeding position.
Figure 8B:
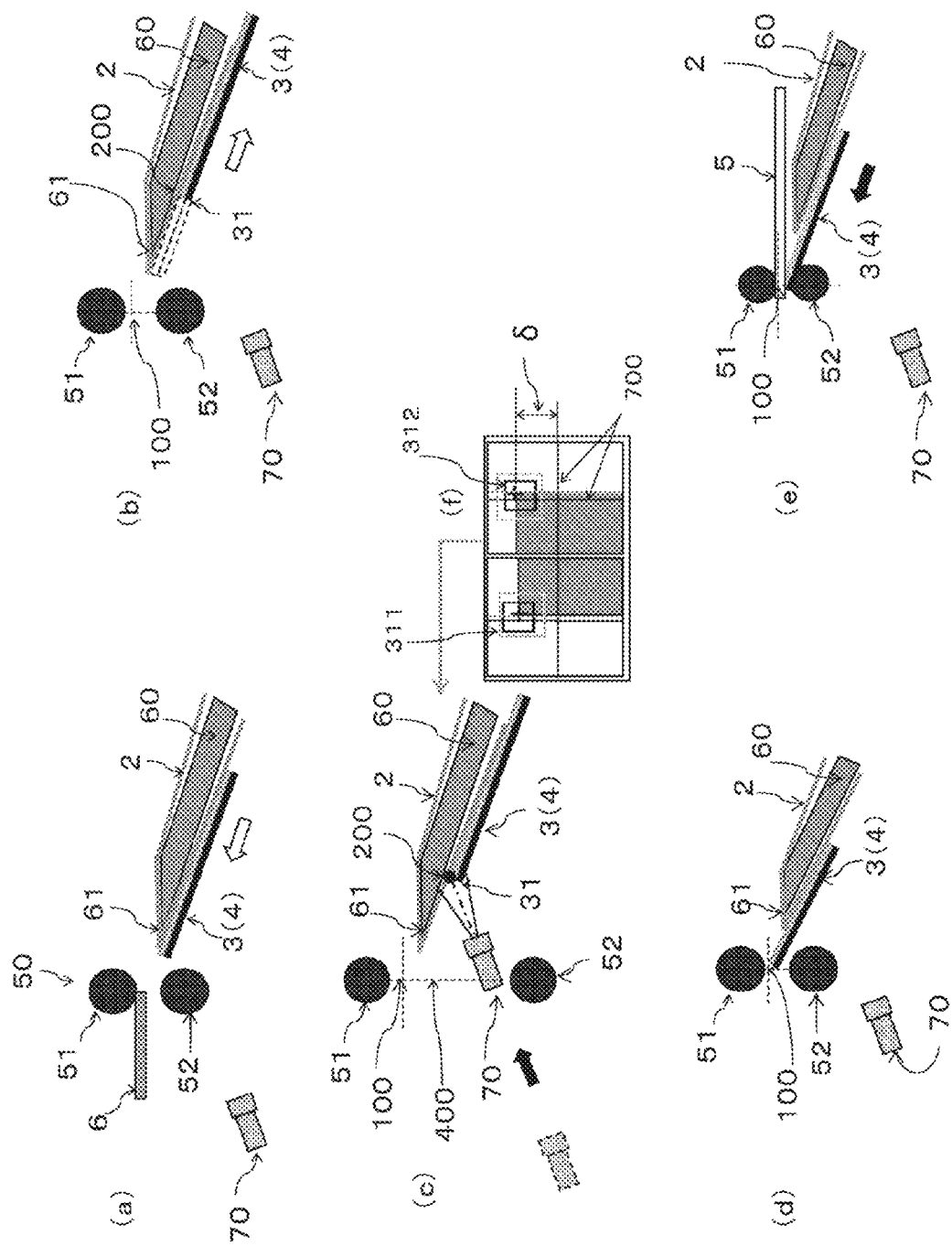
FIG. 8B illustrates schematic diagrams showing each of operation steps of a leading end of an optical film at a predetermined laminating position corresponding to FIG. 7(b) and at a predetermined feeding position.

The method for manufacturing an optical display device 6 according to the present invention is also characterized by operation steps (a) to (e) of a leading end 31 of an optical film sheet 3 at each of a predetermined laminating position 100 where lamination rollers 51, 52 provided to open/close in upward/downward direction is arranged and a predetermined feeding position 200 provided at upstream of a tip-end 61 of a peeling member 60, as shown in FIG. 8A or 8B.

Figure 7:
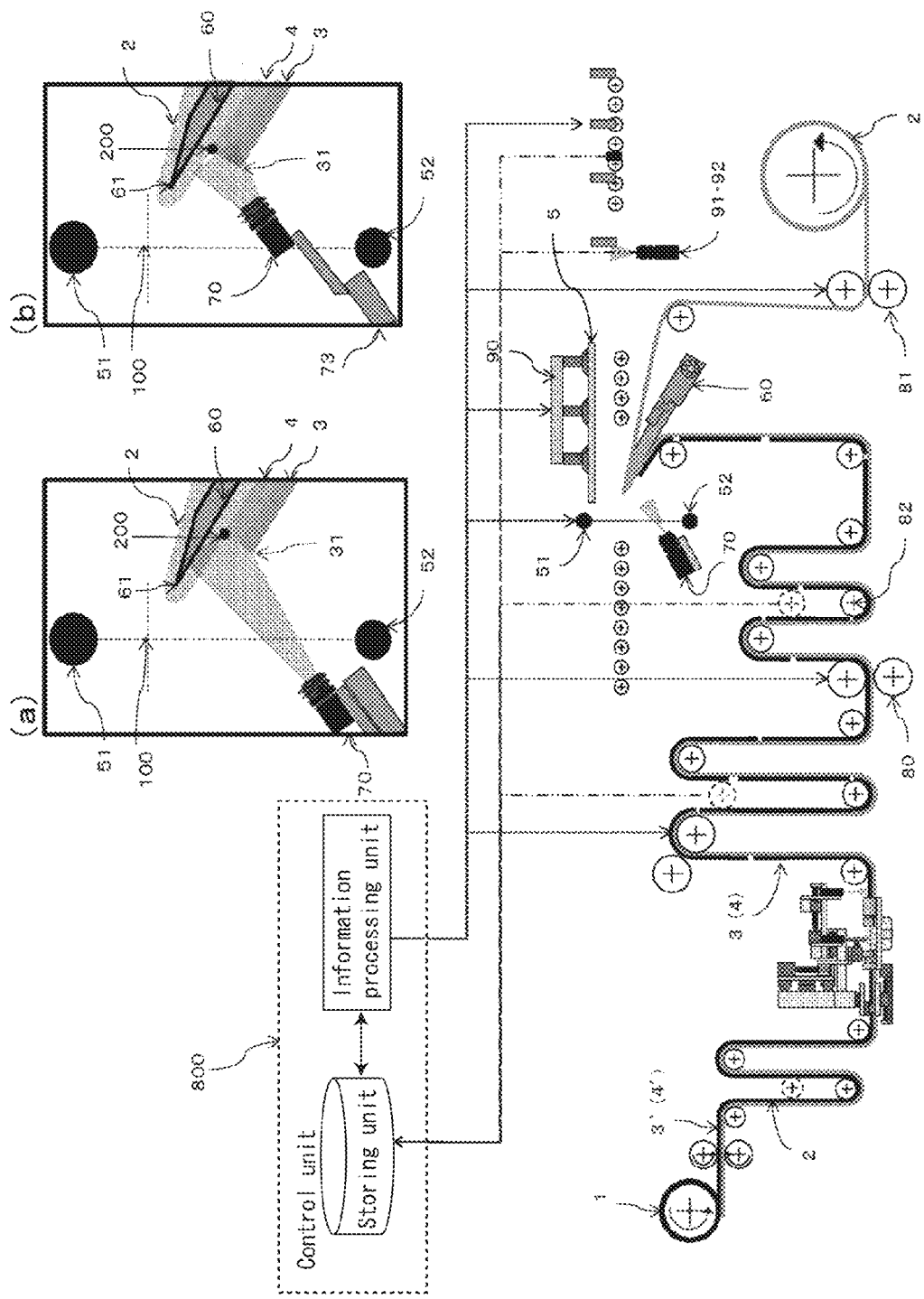
FIG. 7 illustrate a side view showing an entire apparatus used in another embodiment of the present invention for manufacturing an optical display device by laminating an optical film sheet and a panel component using lamination rollers configured to open/close in upward/downward direction at a predetermined laminating position.

FIG. 7(*a*) shows that an optical film sheet 3 is supported together with an adhesive layer 4 on a carrier film 2 in a state where one of opposite surfaces thereof is folded to inside at a tip-end 61 configuring a head portion of a peeling member 60 and passed around the peeling member 60, and also shows a film leading end detecting unit 70 which operates to read the leading end 31 of the optical film sheet 3 immediately before being laminated to a panel component 5 through a space 400 formed between the lamination rollers 51, 52 which are non-active and opened in upward/downward direction.

FIG. 7(b) shows a film leading end detecting unit 70 which is moved by a moving unit 73 with, for example, a built-in servo motor, to the space 400 formed between the lamination rollers 51, 52 which are non-active and opened in upward/downward direction, and operated to read the leading end 31 of the optical film sheet 3 immediately before being laminated to a panel component 5. Although not shown in FIG. 7(b), the film leading end detecting unit 70 is retracted from the space 400 by the moving unit 73 immediately before laminating the panel component 5 and the optical film sheet 3 at the predetermined laminating position 100 and the lamination rollers 51, 52 are closed in upward/downward direction, as described later.

The apparatus 10 shown in FIG. 7(a) is an apparatus configured to read the leading end 31 of an optical film sheet 3 supported on a carrier film 2, after completing lamination of a preceding optical film sheet 3 and a preceding panel component 5, by switching a laminating unit 50 to non-active state and opening the lamination rollers 51, 52 in upward/downward direction with respect to a feeding direction thereof, and then operating the film leading end detecting unit 70 through the space 400 formed between the lamination rollers 51, 52, as shown in operation steps (a) to (e) in FIG. 8A.

In the method with such an apparatus 10, the lamination rollers 51, 52 are closed in upward/downward direction and the laminating unit 50 is switched to active when a lamination-start position 500 of the panel component 5 and the leading end 31 of an optical film sheet 3 establishing a head-out state are matched at the predetermined laminating position 100, then, the optical film sheet 3 and the panel component 5 are laminated via the adhesive layer 4 while the optical film sheet 3 is further peeled together with the adhesive layer 4 from the carrier film 2 under peeling action of the peeling member 60.

Figure 9:
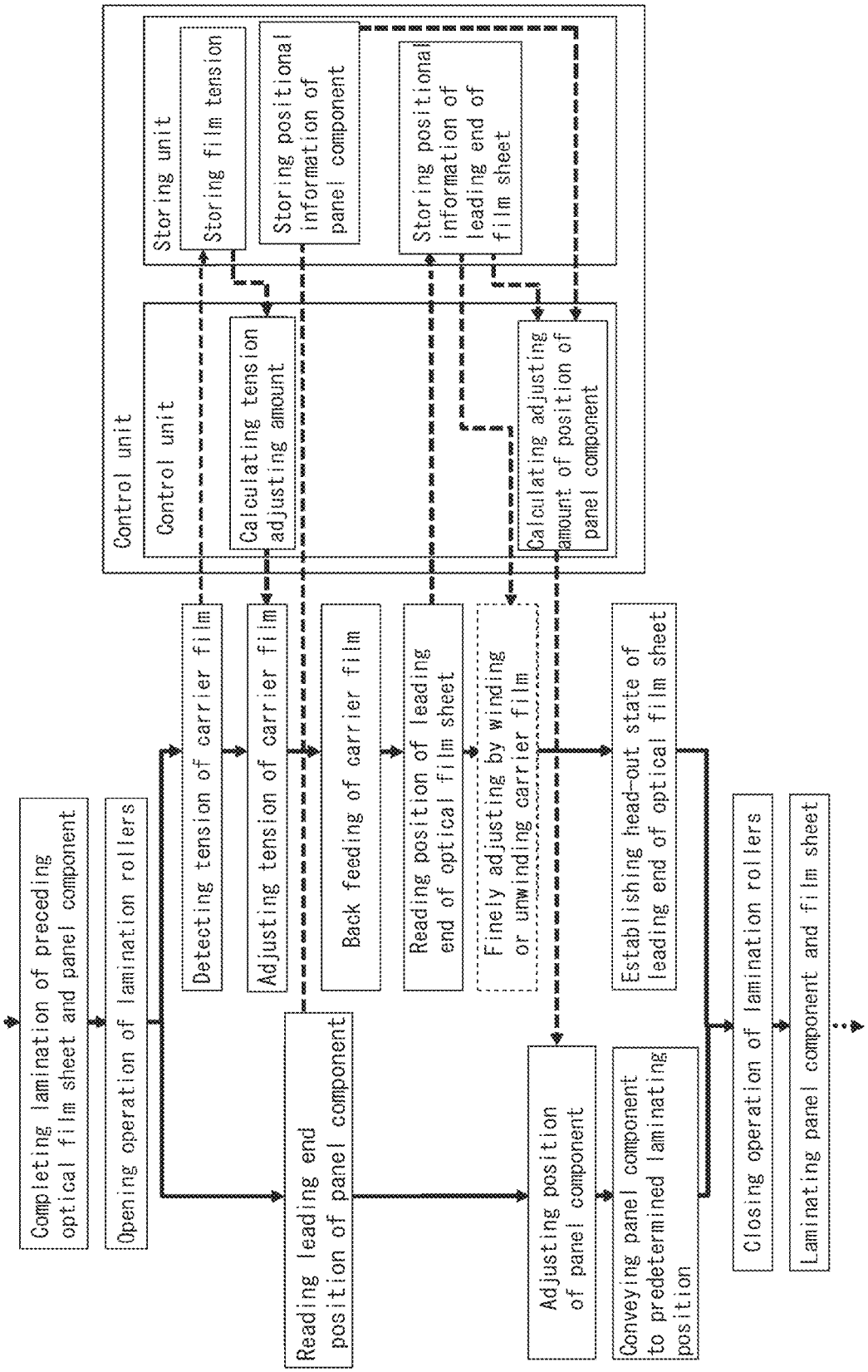
FIG. 9 illustrates control flow chart representing a manufacturing process of an apparatus for manufacturing an optical display device using lamination rollers configured to perform laminating operation and to open/close in upward/downward direction with respect to a feeding direction.

To this end, as is clear from a flow chart in FIG. 9, a control unit 800 of the apparatus 10 associates and controls each of an open/close operation of the lamination rollers 51, 52 in upward/downward direction and a laminating operation of the laminating unit 50, an operation of the film leading end detecting unit 70, winding and unwinding operation of the carrier film 2 by a carrier film feeding unit 8, and an operation of a panel component conveying unit 90.

The flow chart in FIG. 9 is an example of a controlling method, which shows details of controls by the control unit 800 from the operation step (c) for positioning a leading end 31 of an optical film sheet 3 to a predetermined feeding position 200 by opening lamination rollers 51, 52 and back-feeding a carrier film 2, to immediately before the operation step (e) for conveying a panel component 5 to the predetermined laminating position 100 and matching a lamination-start position 500 of the panel component 5 with the leading end 31 of the optical film sheet 3 establishing a head-out state, i.e., to an operation for closing the lamination rollers 51, 52. More particularly, "opening lamination rollers" and "switching a laminating unit to non-active"(not shown) are carried out after "completing lamination of preceding optical film sheet and panel component". Further, after detecting and adjusting tension of the carrier film 2, a back-feeding operation of the carrier film 2 is carried out. Then, after reading the leading end 31 of the optical film sheet 3, positioning the leading end 31 to the predetermined feeding position 200 based on the positional information 310 of the leading end 31 and appropriately fine-adjusting the leading end 31 by winding or unwinding the carrier film 2, "establishing a head-out state of leading end of optical film sheet" and "conveying panel component to a predetermined laminating position" are carried out. Finally, "laminating panel component and optical film sheet" is carried out by "closing lamination rollers".

The apparatus 10 shown in FIG. 7(b) uses a film leading end detecting unit 70 equipped with a moving unit 73 with, for example, a built-in servo-motor, to move the film leading end detecting unit 70 by the moving unit 73 to the space 400 formed between the lamination rollers 51, 52 opened in upward/downward direction, and operates the leading end detecting unit 70 to read the leading end 31 of the optical film sheet 3, as shown in operation steps (a) to (e) in FIG. 8B.

In the method with such apparatus 10, the film leading end detecting unit 70 is retracted from the space 400 by the moving unit 73 and the lamination rollers 51, 52 are closed in upward/downward direction and a laminating unit is switched to active when a lamination-start position 500 of the panel component 5 and the leading end 31 of an optical film sheet 3 establishing a head-out state are matched at the predetermined laminating position 100, then the optical film sheet 3 and the panel component 5 are laminated via the adhesive layer 4 while the optical film sheet 3 is further peeled together with the adhesive layer 4 from the carrier film 2 under peeling action of the peeling member 60.

To this end, as is clear from a flow chart in FIG. 9, a control unit 800 of the apparatus 10 associates and controls an open/close operation of the lamination rollers 51, 52 in upward/downward direction and a laminating operation thereof, an operation of the film leading end detecting unit 70 associated with the moving unit 73, an operation of winding or unwinding the carrier film 2 by a carrier film feeding unit 8, and an operation of conveying a panel component by a panel component conveying unit 90.

The method for manufacturing an optical display device 6 with an apparatus 10 provided with lamination rollers 51, 52 configured to open/close in upward/downward direction arranged at a predetermined laminating position 100 is characterized in that, when compared with the method with an apparatus 10 provided with conventional lamination rollers which perform only laminating, reading and/or detecting the leading end 31 is more surely performed, and matching the lamination-start position 500 of the panel component 5 with the leading end 31 of the optical film sheet 3 is more facilitated since a head-out state of the leading end 31 of the optical film sheet is established at the open predetermined laminating position 100, in either case.

More particularly, the method shown in FIG. 8A or FIG. 8B is characterized by operation steps (a) to (e) of the leading end 31 of the optical film sheet 3 at each of the predetermined laminating position 100 and a feeding position 200 provided on the peeling member 60.

FIG. 8A(a) to FIG. 8A(e) shows operation steps of a leading end 31 of an optical film sheet 3 at each of a predetermined laminating position 100 and a predetermined feeding position 200 provided at upstream of the tip-end 61 of a peeling member 60 when a film leading end detecting unit 70 is activated to read the leading end 31 of the optical film sheet 3 through the space 400 formed between lamination rollers 51, 52.

FIG. 8B(a) to FIG. 8B(e) also shows operation steps of the leading end 31 of the optical film sheet 3 at each of the predetermined laminating position 100 and a predetermined feeding position 200 provided on upstream of the tip-end 61, when a moving unit 73 with, for example, a built-in servo motor is activated to move the film leading end detecting unit 70 to the space 400 formed between lamination rollers 51, 52, and the film leading end detecting unit 70 is activated to read the leading end 31 of the optical film sheet 3.

In the operation step (c) in FIG. 8A, the film leading end detecting unit 70 is operated to read the leading end 31 of the optical film sheet 3 positioned at the predetermined feeding position 200 provided at upstream of the tip-end 61 of the peeling member 60 by back-feeding operation, through the space 400 formed between the lamination rollers 51, 52 opened in upward/downward direction as the laminating unit 50 is switched to non-active. Next, at the predetermined laminating position 100, when the lamination-start position 500 of the panel component 5 matches with the leading end 31 of the optical film sheet 3 establishing a head-out state, the lamination rollers 51, 52 are operated to close in upward/downward direction and the laminating unit 50 is switched to active. These operations have features not to generate lamination error, i.e., technical features different from those of the operation step (c) in FIG. 5.

In the operation step (c) in FIG. 8B, the moving unit 73 is also activated to move the film leading end detecting unit 70 to the space 400 formed between the lamination rollers 51, 52 and the film leading end detecting unit 70 is activated to read the leading end 31 of the optical film sheet 3 nearly in close-up state. Next, at the predetermined laminating position 100, when the lamination-start position 500 of the panel component 5 matches with the leading end 31 of the optical film sheet 3 establishing a head-out state, the lamination rollers 51, 52 are operated to close in upward/downward direction and the laminating unit 50 is switched to active. These operations have features designed to reduce measurement error.

Figure 10:
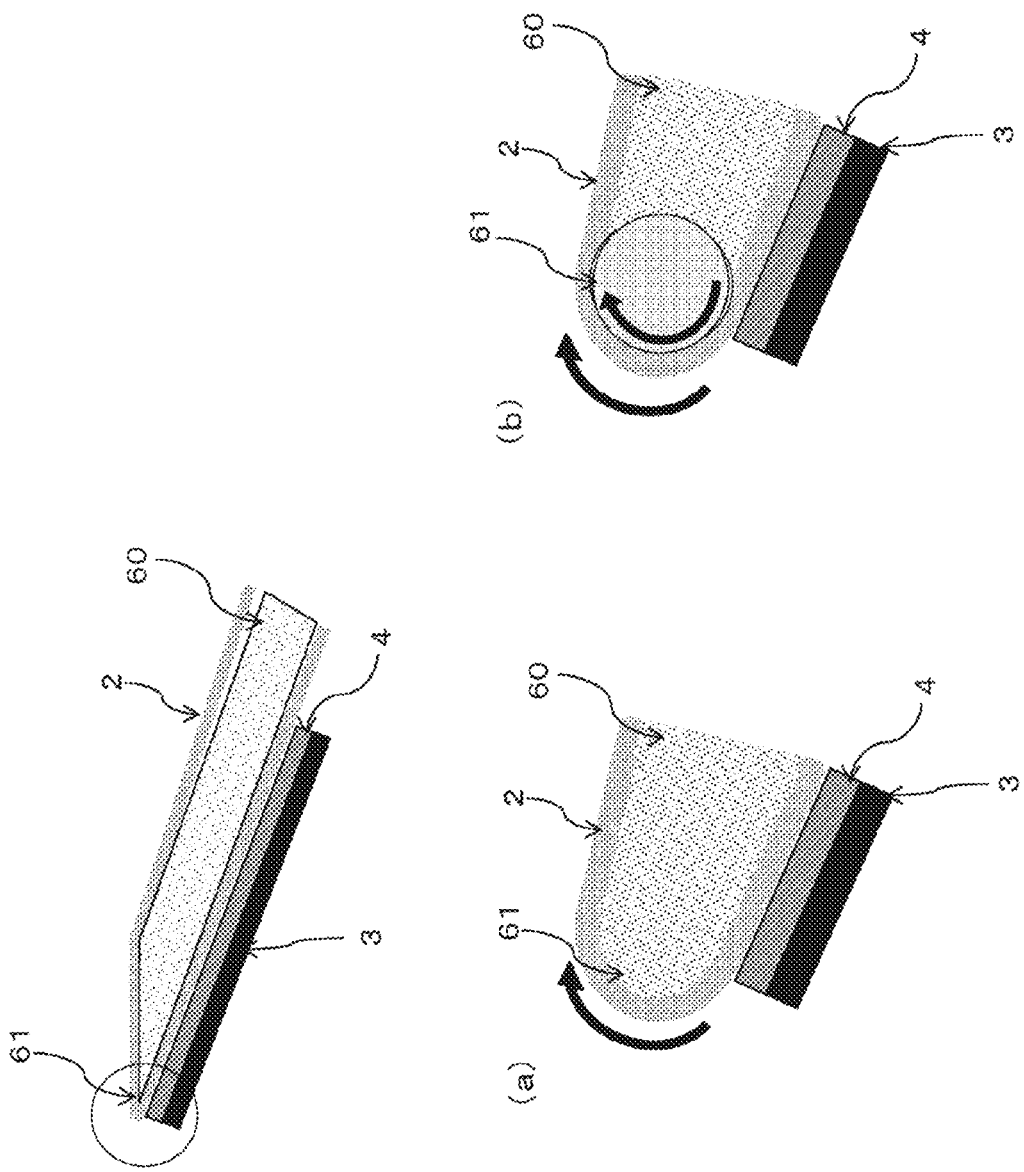
FIG. 10 illustrates schematic diagram showing radius of curvature R and rotating structure of a tip-end configuring a head portion of a peeling member

FIG. 10 is a schematic view showing a structure of a tip-end 61 configuring a peeling member 60. As described in detail below, a radius of curvature R in a structure of the tip-end 61 is determined by a relationship between a thickness X of an optical film sheet 3 and a peeling force Z of a carrier film 2 against an adhesive layer 4 such that flexural reactive force of the optical film sheet 3 is greater than the peeling force Z of the carrier film 2 against the adhesive layer 4. Tension of the carrier film 2 under winding or unwinding, one side of which is folded to inside at the tip-end 61, generates difference between at upstream and at downstream of the tip-end 61 depending on setting of the radius of curvature R. Therefore, the tip-end of the peeling member 60 preferably has radius of curvature R greater than a certain radius as shown in FIG. 10(a), or is configured as a rotating structure as shown in FIG. 10(b).

(Calculation of Radius of Curvature R of Tip-End 61 of Peeling Member 60)

An optical film laminate 1 consists of a plurality of optical film sheets 3 continuously supported on one of opposite surfaces of a long web of a carrier film 2 via an adhesive layer 4. The plurality of the optical film sheets 3 continuously supported on the carrier film 2 are gradually peeled starting from the leading end 31 from the carrier film 2 together with the adhesive layer 4 under peeling action of the peeling body 60 having the tip-end 61 abutting to another surface, i.e., the rear surface of the carrier film 2 because, in particular, when the tip end 61 arrives at a position corresponding to the back side of slit lines which form the plurality of the optical film sheets 3 supported on the carrier film 2 with the adhesive layer 4 by winding the optical film laminate 1 without slacking the optical film laminate 1 which is passed around the pealing member 60, the flexural reactive force of the optical film sheet 3 with the tip-end 61 having radius of curvature R becomes greater than the peeling force of the carrier film 2 against the adhesive layer 4. What is described in the above depends on the relative relationship between the radius of curvature R of the tip-end 61, the thickness X of the optical film sheet 3, and the peeling force Z of the carrier film 2 against the adhesive layer 4. In the following experimental system, the optical film sheet 3 is referred as "substrate".

The radius of curvature R of the tip-end 61 of the peeling member 60 is determined based on the relative relationship between the thickness X of the substrate and the peeling force Z of the carrier film against the adhesive layer 4. One example of the relative relationship is described below. FIG. 11 shows an experimental system implemented.

As shown in the left diagram in FIG. 11, there is provided an optical film laminate 1 comprising a carrier film 2 and a substrate 3 having a longitudinal length shorter than the carrier film 2 and releasably laminated to the carrier film 2 via an adhesive layer 4, a rear surface of the carrier film 2 abutted against a tip-end 61 of a peeling member 60 having a radius of curvature R and acting as a peeling point, the optical film laminate 1 being passed around the tip-end 61 of the peeling member 60 such that a border of a portion where the carrier film 2 and the substrate 3 having the adhesive layer 4 are laminated, and a portion of the carrier film 2 without the substrate are positioned at upstream of the tip end 61 with the radius of curvature R, and an end portion of the carrier film 2 without the substrate which the tip-end 61 abuts to the rear surface thereof is folded by a guide roller and upwardly pulled at a constant rate.

Thus, as shown in the right diagram in FIG. 11, when the border between the portion where the carrier film 2 and the substrate 3 having the adhesive layer 4 are laminated, and the portion of the carrier film 2 without the substrate arrive at the tip-end 61 with the radius of curvature R of the peeing member 60, the substrate may or may not be peeled from the carrier film 2 depending on the relationship between the flexural reactive force of the substrate 3 and the peeling force of the carrier film 2 against the adhesive layer 4, i.e., depending on the length of R. It is tested whether or not the substrate 3 is peeled at the peeling point when the radius of curvature R of the tip-end 61 is varied.

Reference is now made to FIG. 12. It is tested as to whether or not the substrate 3 is peeled by classifying the verified substrates to one completely peeled, one which the substrate 3 having the peeled adhesive layer 4 was dragged obliquely upward by the carrier film 2 and not completely peeled, and one which was not peeled. FIG. 12 shows the test results. The three substrates used in the test were VEGQ 1723 NTB (thickness: 213 μm), CIG 1484 CVAG 350 (thickness: 131 μm) of Nitto Denko Corporation, and PET T-390 (thickness: 38 μm) of Mitsubishi Plastics, Inc, each having a width of 50 mm, considering difference in rigidity (thickness). The thickness X is a value of an optical film sheet which an adhesive layer 4 is not formed thereon. Although flexural rigidity is derived from elastic modulus of the substrate 3, films for use in liquid-crystal display devices are generally made of synthetic resin, and there is not a significant difference in elastic modulus of the films. Therefore, degree of flexural rigidity is generally determined by the thickness of the substrate.

In the test, a weight of 1 kg/50 mm was attached to a lower end of the optical film laminate 1 in order to apply tension, as shown in FIG. 11. A 180-degree peeling force of the carrier film 2 against the adhesive layer 4 was in a range of 0.05 to 0.15 [N/50 mm]. In the test, conveying speed was 0.6 [m/min]. Values of R[mm] at which peeling was failed are plotted for the thicknesses X of the substrate 3 in a range of 1 to 25 mm.

Figure 13:
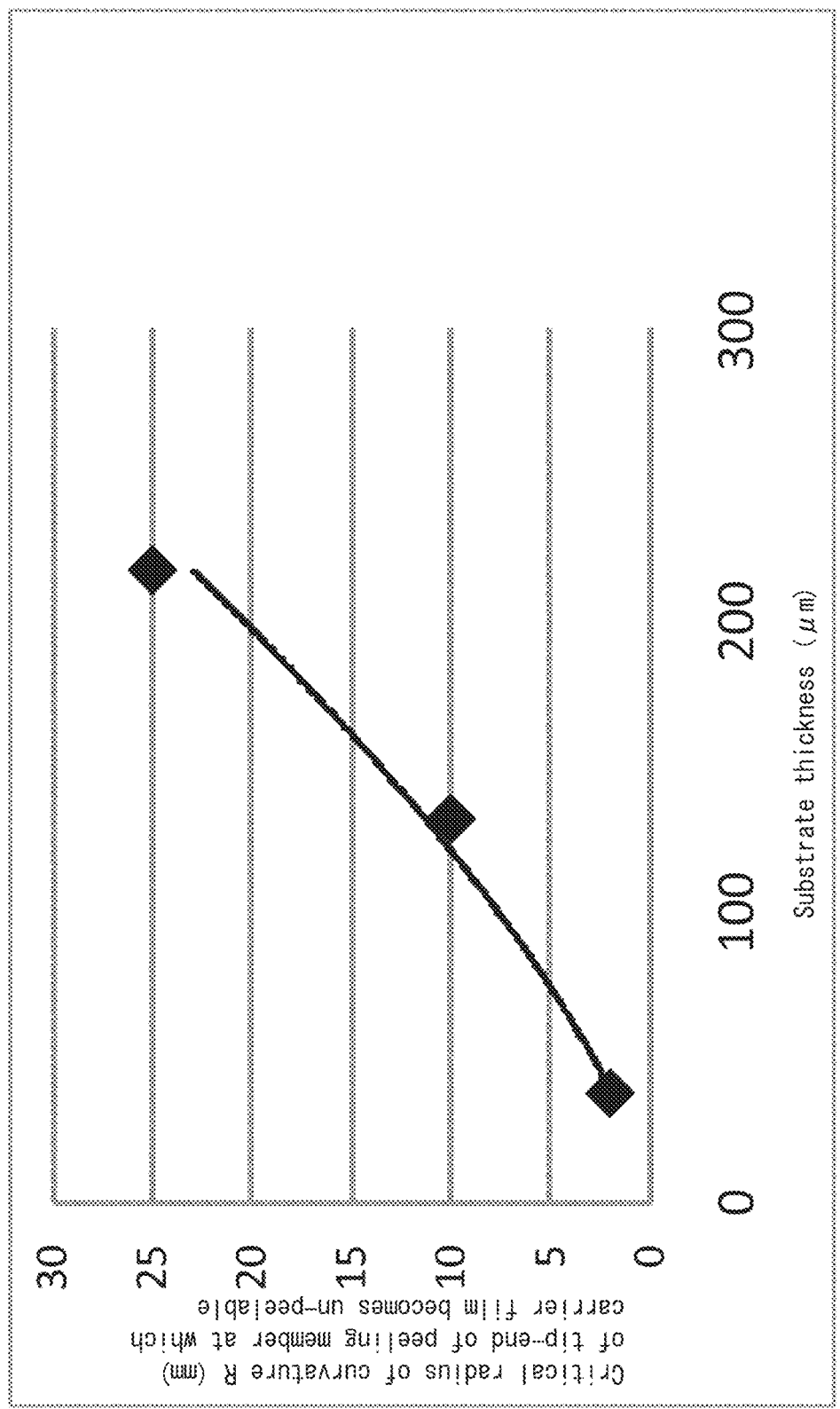
FIG. 13 is a graph plotting a relationship between a thickness of a substrate with an adhesive layer and a critical R incapable of causing peeling based on the result shown in FIG. 12.

As is clear from FIG. 12, the substrate 3 with a thickness of 213 μm was completely peeled when the radius of curvature R was or less than 22.5 mm, however, it was not peeled or not completely peeled when the radius of curvature R was 25.0 mm. The substrate 3 with a thickness of 131 μm was completely peeled when the radius of curvature R was or less than 7.5 mm, however, it was not peeled or not completely peeled when the radius of curvature R was 10.0 mm. The substrate 3 with a thickness of 38 μm was completely peeled when the radius of curvature R was or less than 1.5 mm, however, it was not peeled or not completely peeled when the radius of curvature R was 2.0 mm FIG. 13 shows the relationship between thickness X of the substrate 3 and critical R at which the substrate 3 does not peel. Specifically, the substrate 3 having an adhesive layer 4 cannot be peeled when it is in a region above the line in FIG. 13. On the other hand, the substrate 3 having an adhesive layer 4 can be peeled if it is in a region below the line. In other words, this line is a threshold as to whether the substrate can or cannot be peeled.

Although the present invention has been described for preferable embodiments, those skilled in the art may understand that various modifications may be made and elements may be replaced with equivalents without departing the scope of the present invention. Therefore, the present invention should not be limited to specific embodiments disclosed as the best mode of embodiments considered for implementing the present invention, and it is intended that the present invention encompasses all embodiments which belong to claims.

EXPLANATION OF NUMERICAL CHARACTERS

1: Optical film laminate
2: Carrier film
3': Optical film
3: Optical film sheet
31: Leading end of optical film sheet
310: Positional information of leading end
311, 312: Opposing edges of leading end face of optical film sheet
4': Adhesive layer included in optical film
4: Adhesive layer included in optical film sheet
5: Panel component
500: Lamination-start position of panel component
6: Optical display device
10: Apparatus for manufacturing optical display device
50: Laminating unit
51, 52: Lamination rollers
60: Peeling member
61: Tip-end of peeling member
70: Film leading end detecting unit
71, 72: Imaging unit
73: Moving unit
8: Carrier film feeding unit
80, 81: Forward/reverse feed rollers
82: Dancer roller
100: Predetermined laminating position
200: Predetermined feeding position
300: Waiting position
400: Space
800: Controlling unit
A: Slitting unit

The invention claimed is:

1. A method for manufacturing an optical display device by sequentially peeling a plurality of optical film sheets together with an adhesive layer from a carrier film, the optical film sheets being continuously supported via the adhesive layer on one of opposite surfaces of a long web of the carrier film which configures an optical film laminate, and laminating the plurality of optical film sheets to one of opposite surfaces of respective ones of a plurality of panel components via the adhesive layer by using a laminating unit at a predetermined laminating position, the method comprising:

a first step of, after completing lamination of a preceding optical film sheet to one of opposite surfaces of a preceding panel component at the predetermined laminating position, unwinding the carrier film in a state where another surface thereof folded to inside at a tip-end configuring a head portion of a peeling member and the carrier film is passed around the peeling member, and backwardly feeding a leading end of the optical film sheet supported on the carrier film to a predetermined feeding position provided at upstream of the tip-end of the peeling member;

a second step of operating a film leading end detecting means when the leading end of the optical film sheet is unwound together with the carrier film and stopped at the predetermined feeding position, to read the leading end of the optical film sheet;

a third step of forwardly feeding the leading end of the optical film sheet to the predetermined laminating position, while peeling the optical film sheet together with the adhesive layer from the carrier film by winding the carrier film;

a fourth step of forwardly feeding the panel component to be laminated to the optical film sheet from a predetermined waiting position to the predetermined laminating position; and a fifth step of laminating the optical film sheet and the panel component via the adhesive layer while further peeling the optical film sheet together with the adhesive layer from the carrier film, when the panel component and the leading end of the optical film sheet arrive at the predetermined laminating position.

2. The method according to claim 1, wherein the leading end of the optical film sheet establishing a head-out state and a lamination-start position of the panel component are matched at the predetermined laminating position when the panel component and the leading end of the optical film sheet arrive at the predetermined laminating position.

3. The method according to claim 1, wherein the laminating unit comprises a pair of open/close lamination rollers.

4. The method according to claim 3, wherein the first step further comprises a step of switching the laminating unit to non-active and opening the pair of the lamination rollers; the second step further comprises a step of reading the leading end of the optical film sheet through a space formed between the pair of the lamination rollers; and the fifth step further comprises a step of closing the pair of the lamination rollers and switching the laminating unit to active, thereby the optical film sheet and the panel component are laminated via the adhesive layer while further peeling the optical film sheet together with the adhesive layer from the carrier film.

5. The method according to claim 3, wherein the first step further comprises a step of switching the laminating unit to non-active and opening the pair of the lamination rollers; the second step further comprises a step of moving the film leading end detecting means to a space formed between the pair of the lamination rollers and operating the film leading end detecting means to read the leading end of the optical film sheet; the fifth step further comprises a step of retracting the film leading end detecting means from the space and closing the pair of the lamination rollers and switching the laminating unit to active, thereby the optical film sheet and the panel component are laminated via the adhesive layer while further peeling the optical film sheet together with the adhesive layer from the carrier film.

6. The method according to claim 1, wherein the second step further comprises a step of forwardly or backwardly feeding the leading end of the optical film sheet to further position the leading end of the optical film sheet to the predetermined feeding position by winding or unwinding the carrier film without slacking the carrier film based on positional information of the leading end read by the film leading end detecting means.

7. The method according to claim 1, wherein the first, the third and the fifth steps are configured to operate a carrier film feeding means comprising forward/reverse feed rollers arranged at upstream and at downstream of the tip-end of the peeling member and wind or unwind the carrier film without slacking the carrier film.

8. The method according to claim 1, wherein the second step is configured to read opposing edges of a leading end face of the optical film sheet which is orthogonal to a feeding direction of the carrier film.

9. The method according to claim 1, wherein the film leading end detecting means comprises a plurality of imaging devices having a measurement reference specifying a position of each of opposing edges of the leading end face of the optical film sheet, and the second step further comprises a step of operating the imaging devices to specify the positions of the opposing edges based on the measurement reference.

10. The method according to claim 1, wherein the fourth step further comprises a step of detecting the panel component conveyed to the predetermined waiting position.

11. The method according to claim 1, wherein the fourth step further comprises a step of pre-adjusting position and posture of the panel component conveyed to the predetermined laminating position at the predetermined waiting position.

12. The method according to claim 1, wherein the fourth step further comprises a step of synchronizing the panel component forwardly fed to the predetermined laminating position with the optical film sheet forwardly fed to the predetermined laminating position.

13. An apparatus for manufacturing an optical display device by sequentially peeling a plurality of optical film sheets together with an adhesive layer from a carrier film, the optical film sheets being continuously supported via the adhesive layer on one of opposite surfaces of a long web of the carrier film which configures an optical film laminate, and laminating the plurality of optical film sheets to one of opposite surfaces of respective ones of a plurality of panel components via the adhesive layer at a predetermined laminating position, the apparatus comprising:

a laminating unit operating to laminate the optical film sheet to one of opposite surfaces of the panel component via the adhesive layer at the predetermined laminating position;

a peeling member acting to forwardly feed the optical film sheet to the predetermined laminating position while peeling the optical film sheet together with the adhesive from the carrier film layer by winding the carrier film, the peeling member comprising a head portion where another surface of the carrier film is folded to inside and a body where the carrier film is passed around;

a film leading end detecting unit operating to read a leading end of the optical film sheet supported on the carrier film backwardly fed to a predetermined feeding position provided at upstream of the tip-end of the peeling member, by unwinding the carrier film in a state where another surface thereof is folded to inside at a tip-end configuring a head portion of the peeling member and the carrier film is passed around the peeling member;

a carrier film feeding unit interlockingly operating to wind or unwind the carrier film without slacking the carrier film in a state where another surface thereof is folded to inside at the tip-end and the carrier film is passed around the peeling member;

a panel component conveying unit operating to forwardly feed the panel component to be laminated to the optical film sheet, the optical film sheet being forwardly fed to the predetermined laminating position, from a predetermined waiting position to the predetermined laminating position; and a control means for associating and operating each of the laminating unit, the film leading end detecting unit, the carrier film feeding unit and the panel component conveying unit to laminate the optical film sheet and the panel component via the adhesive layer while further peeling the optical film sheet together with the adhesive layer from the carrier film, when the leading end of the optical film sheet peeled together with the adhesive layer from the carrier film under peeling action of the peeling member and forwardly fed to the predetermined laminating position and the panel component conveyed to the predetermined laminating position arrive at the predetermined laminating position.

14. The apparatus according to claim 13, wherein the control means is configured to match a leading end of the optical film sheet establishing a head-out state and a lamination-start position of the panel component, when the panel component and the leading end of the optical film sheet arrive at the predetermined laminating position.

15. The apparatus according to claim 13, wherein the laminating unit comprises a pair of open/close lamination rollers.

16. The apparatus according to claim 15, wherein the apparatus operates such that, after completing lamination of a preceding optical film sheet and a preceding panel component, the laminating unit is switched to non-active and the pair of lamination rollers are opened, then the film leading end detecting unit is operated to read the leading end of the optical film sheet supported on the carrier film through a space formed between the pair of lamination rollers; and the pair of lamination rollers are closed and the laminating unit is switched to active when the leading end of the optical film sheet peeled together with the adhesive layer from the carrier film and forwardly fed to the predetermined laminating position and the panel component arrive at the predetermined laminating position, thereby the optical film sheet and the panel component are laminated via the adhesive layer while the optical film sheet is further peeled together with the adhesive layer from the carrier film under the peeling action of the peeling member.

17. The apparatus according to claim 16, the apparatus is configured to match a leading end of the optical film sheet establishing a head-out state and a lamination-start position of the panel component when the panel component and the leading end of the optical film sheet arrive at the predetermined laminating position.

18. The apparatus according to claim 15, wherein the film leading end detecting unit is equipped with a moving unit, and after completing lamination of a preceding optical film sheet and a preceding panel component, the laminating unit is switched to non-active and the pair of lamination rollers are opened, then the film leading end detecting unit is moved to a space formed between the pair of lamination rollers by the moving unit and is operated to read the leading end of the optical film sheet supported on the carrier film; and the film leading end detecting unit is retracted from the space by the moving unit, the pair of lamination rollers are closed, and the laminating unit is switched to active, when the leading end of the optical film sheet peeled together with the adhesive layer from the carrier film and forwardly fed to the predetermined laminating position and the panel component arrive at the predetermined laminating position, thereby the optical film sheet and the panel component are laminated via the adhesive layer while the optical film sheet is further peeled together with the adhesive layer from the carrier film.

19. The apparatus according to claim 18, the apparatus is configured to match a leading end of the optical film sheet establishing a head-out state and a lamination-start position of the panel component when the panel component and the leading end of the optical film sheet arrive at the predetermined laminating position.

20. The apparatus according to claim 13, wherein the carrier film feeding unit is operated based on positional information of the leading end of the optical film sheet read by the film leading end detecting unit, thereby the leading end of the optical film sheet supported on the carrier film is further positioned to the predetermined feeding position by forwardly or backwardly feeding the optical film sheet by winding or unwinding the carrier film without slacking thereof.

21. The apparatus according to claim 13, the carrier film feeding unit comprises forward/reverse feed rollers respectively arranged at least at upstream and at downstream of the tip-end of the peeling member.

22. The apparatus according to claim 21, wherein, in the carrier film feeding unit configured with a forward/reverse roller, the peeling member, and another forward/reverse roller, a dancer roller is arranged between one of the forward/reverse rollers and the peeling member and cooperatively operated with the another forward/reverse roller, thereby winding or unwinding the carrier film without slacking thereof.

23. The apparatus according to claim 13, wherein the film leading end detecting unit comprises a plurality of imaging devices having a measurement reference positioned in proximity to locations corresponding to opposing edges of a leading end face of the optical film sheet orthogonal to a feeding direction thereof, and the imaging devices are operated to read the opposing edges of the leading end face of the optical film sheet to specify the positions of the opposing edges based on the measurement reference.

24. The apparatus according to claim 13, wherein a panel component detecting unit for detecting the panel component is arranged at the predetermined waiting position, and the control means operates the panel component detecting unit to detect the panel component conveyed to the predetermined waiting position.

25. The apparatus according to claim 13, wherein a panel component position adjusting unit is arranged at the predetermined waiting position, and the control means operates the panel component position adjusting unit to pre-adjust position and posture of the panel component conveyed to the predetermined laminating position by the panel component conveying unit at the predetermined waiting position.

26. The apparatus according to claim 13, wherein the control means further comprises means for interlockingly operating the panel component conveying unit and the carrier film feeding unit to synchronize the panel component forwardly fed to the predetermined laminating position and the optical film sheet forwardly fed to the predetermined laminating position.

* * * * *